United States Patent
Zhang et al.

(10) Patent No.: US 11,281,313 B2
(45) Date of Patent: *Mar. 22, 2022

(54) MOBILE DEVICE COMPRISING STYLUS PEN AND OPERATION METHOD THEREFOR

(71) Applicant: SAMSUNG ELECTRONICS CO., LTD., Suwon-si (KR)

(72) Inventors: Guoliang Zhang, Jiangsu (CN); Rui Zhang, Jiangsu (CN); Juexiao Bian, Jiangsu (CN)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

This patent is subject to a terminal disclaimer.

(21) Appl. No.: 16/674,636

(22) Filed: Nov. 5, 2019

(65) Prior Publication Data

US 2020/0064933 A1 Feb. 27, 2020

Related U.S. Application Data

(63) Continuation of application No. 15/520,119, filed as application No. PCT/KR2015/010429 on Oct. 2, 2015, now Pat. No. 10,509,492.

(30) Foreign Application Priority Data

Oct. 22, 2014 (CN) .......................... 201410567542.7
Dec. 25, 2014 (CN) .......................... 201410823126.9
Aug. 10, 2015 (KR) .......................... 10-2015-0112723

(51) Int. Cl.
*G06F 3/048* (2013.01)
*G06F 3/038* (2013.01)
(Continued)

(52) U.S. Cl.
CPC .......... *G06F 3/0383* (2013.01); *G06F 1/1626* (2013.01); *G06F 3/011* (2013.01);
(Continued)

(58) Field of Classification Search
None
See application file for complete search history.

(56) References Cited

U.S. PATENT DOCUMENTS 8,242,389 B2 8/2012 Chen et al.
8,736,585 B2 5/2014 Omata et al.
(Continued)

FOREIGN PATENT DOCUMENTS

CN 201000588 Y 1/2008
CN 201917881 U 8/2011
(Continued)

OTHER PUBLICATIONS

Communication dated Sep. 4, 2017, issued by The State Intellectual Property Office of P.R. China in counterpart Chinese application No. 201410823126.9.
(Continued)

*Primary Examiner* — Thanh T Vu
(74) *Attorney, Agent, or Firm* — Sughrue Mion, PLLC

(57) ABSTRACT

A mobile device includes a sensing unit configured to determine whether the stylus pen is separated from the mobile device; a communication unit configured to receive a control signal including a first control signal and a second control signal from the stylus pen separated from the mobile device; and a controller configured to operate in a first control mode for performing an operation of an application being executed on the mobile device. The controller performs a first operation of the application in response to the first control signal, and performs a second operation of the application in response to the second control signal.

18 Claims, 21 Drawing Sheets

(51) Int. Cl.

| | | |
|---|---|---|
| *G06F 3/04847* | (2022.01) | |
| *G06F 1/16* | (2006.01) | |
| *G06F 3/0484* | (2022.01) | |
| *G06F 3/01* | (2006.01) | |
| *G06F 3/0354* | (2013.01) | |
| *G06F 3/04817* | (2022.01) | |
| *G06F 3/0482* | (2013.01) | |
| *G06F 3/0489* | (2022.01) | |
| *H04M 1/02* | (2006.01) | |
| *G06F 3/04883* | (2022.01) | |

(52) U.S. Cl.
CPC .......... *G06F 3/017* (2013.01); *G06F 3/03545* (2013.01); *G06F 3/0482* (2013.01); *G06F 3/0484* (2013.01); *G06F 3/04817* (2013.01); *G06F 3/04847* (2013.01); *G06F 3/04897* (2013.01); *H04M 1/0256* (2013.01); *G06F 3/04883* (2013.01); *G06F 2200/1632* (2013.01); *G06F 2203/0384* (2013.01); *G06F 2203/04806* (2013.01); *G06F 2203/04807* (2013.01); *H04M 2250/52* (2013.01)

(56) References Cited

U.S. PATENT DOCUMENTS

| | | | |
|---|---|---|---|
| 8,890,855 B1* | 11/2014 | Lee ........................ | G06F 3/0362 345/179 |
| 2004/0212586 A1 | 10/2004 | Denny, III | |
| 2004/0263493 A1 | 12/2004 | Yueh | |
| 2006/0046650 A1 | 3/2006 | Kohli et al. | |
| 2006/0068851 A1 | 3/2006 | Ashman, Jr. | |
| 2006/0275024 A1 | 12/2006 | McNary | |
| 2008/0122796 A1* | 5/2008 | Jobs ................. | H04M 1/72522 345/173 |
| 2009/0000831 A1 | 1/2009 | Miller et al. | |
| 2009/0052883 A1 | 2/2009 | Lee et al. | |
| 2010/0234077 A1* | 9/2010 | Yoo ........................ | G06F 1/1626 455/566 |
| 2011/0164000 A1 | 7/2011 | Pance | |
| 2012/0009896 A1* | 1/2012 | Bandyopadhyay .......................... | G06F 3/04847 455/411 |
| 2013/0082937 A1* | 4/2013 | Liu ..................... | G06F 3/03545 345/173 |
| 2013/0201162 A1 | 8/2013 | Cavilia | |
| 2013/0335380 A1 | 12/2013 | Griffin et al. | |
| 2014/0055427 A1 | 2/2014 | Kim et al. | |
| 2014/0125606 A1 | 5/2014 | Namkung | |
| 2014/0168176 A1 | 6/2014 | Nowatzyk et al. | |
| 2014/0184829 A1 | 7/2014 | Li | |
| 2014/0253465 A1 | 9/2014 | Hicks et al. | |
| 2014/0253467 A1 | 9/2014 | Hicks et al. | |
| 2014/0253470 A1 | 9/2014 | Havilio | |
| 2014/0267078 A1* | 9/2014 | Kukulski ............ | G06F 3/03545 345/173 |
| 2016/0224828 A1* | 8/2016 | Bose .................... | A61B 5/1126 |

FOREIGN PATENT DOCUMENTS

| | | |
|---|---|---|
| CN | 103139359 A | 6/2013 |
| CN | 103237169 A | 8/2013 |
| CN | 103279289 A | 9/2013 |
| CN | 203290347 U | 11/2013 |
| JP | 2004-264734 A | 9/2004 |
| KR | 10-2009-0131822 A | 12/2009 |
| WO | 2006/036209 A1 | 4/2006 |

OTHER PUBLICATIONS

Communication dated Jan. 22, 2017, issued by The State Intellectual Property Office of P.R. China in counterpart Chinese application No. 201410823126.9.
Communication dated Jul. 11, 2017, from the European Patent Office in counterpart European Application No. 15853109.5.
Anonymous: "Bluetooth Auto Turn Off—Tasker Wiki", Dec. 15, 2011, (3 pages total), retrieved from the Internet: URL: http://tasker.wikidot.com/bluetooth-auto-turn-off [retrieved on Apr. 5, 2018] XP055464908.
Written Opinion (PCT/ISA/237) dated Jan. 13, 2016 issued by the International Searching Authority in counterpart International Application No. PCT/KR2015/010429.
International Search Report (PCT/ISA/210) dated Jan. 13, 2016 issued by the International Searching Authority in counterpart International Application No. PCT/KR2015/010429.
Communication dated Oct. 2, 2018, issued by the European Patent Office in counterpart European Patent Application No. 15853109.5.
Communication dated Apr. 12, 2018, from the European Patent Office in counterpart European Application No. 15853109.5.
Communication dated Feb. 8, 2021 issued by the Indian Patent Office in counterpart Indian Application No. 201737017781.

\* cited by examiner

FIG. 5A
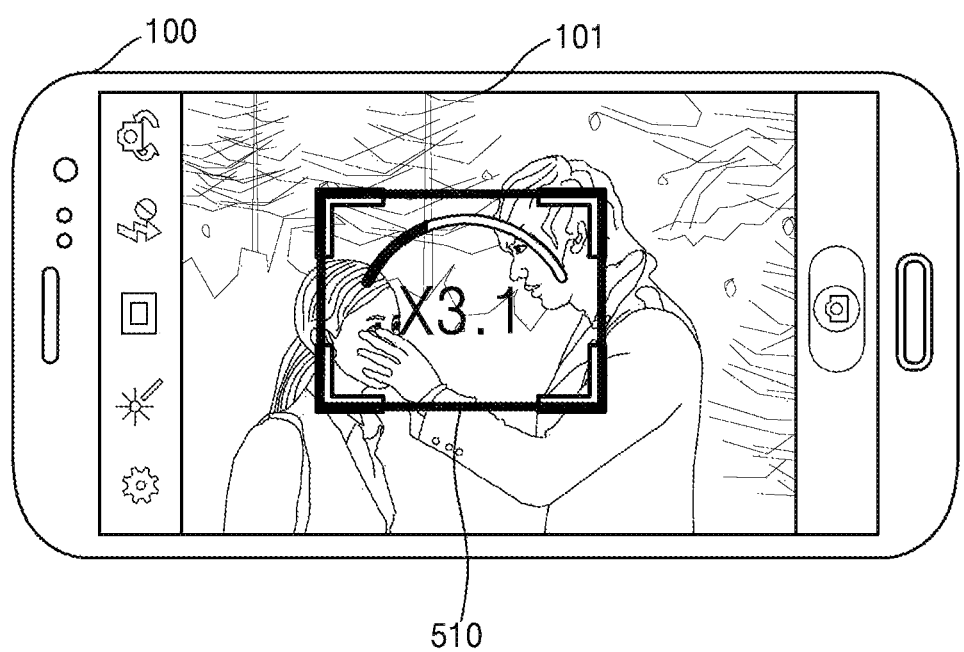
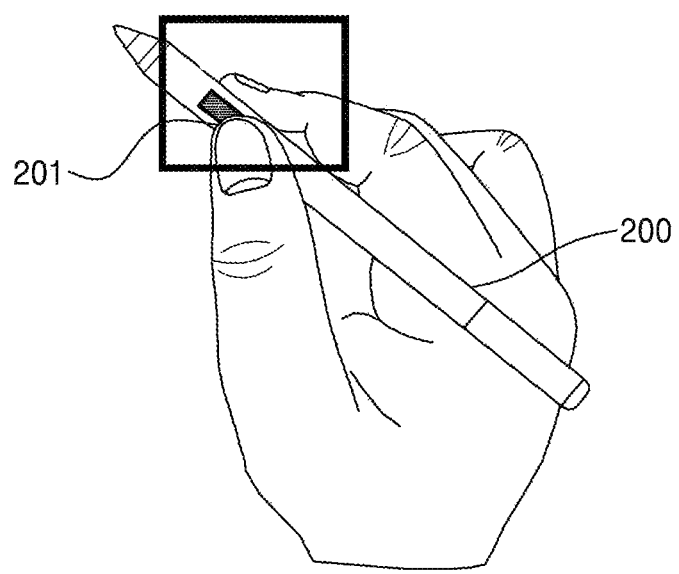

FIG. 5B
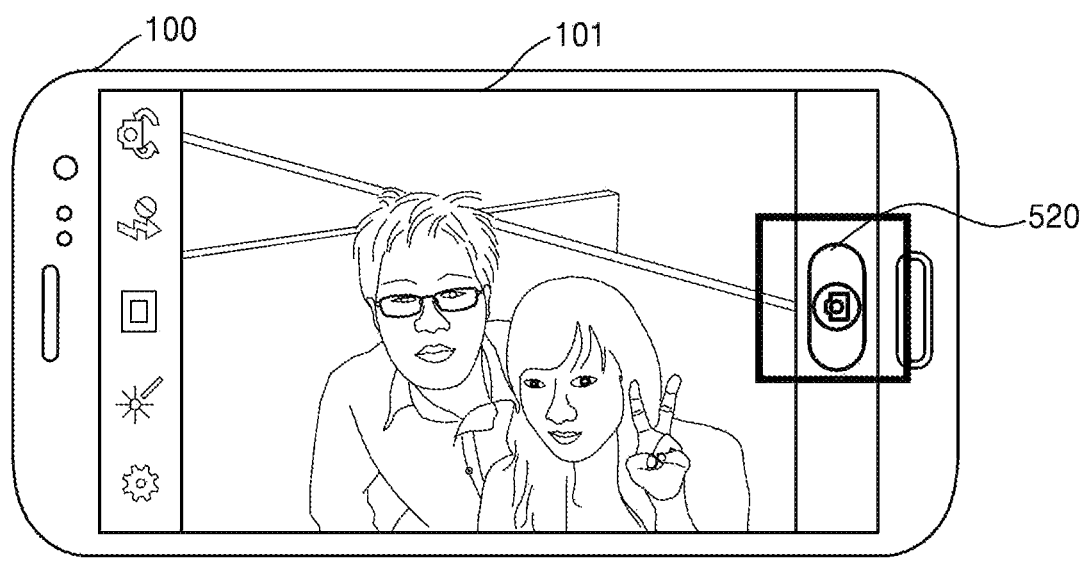
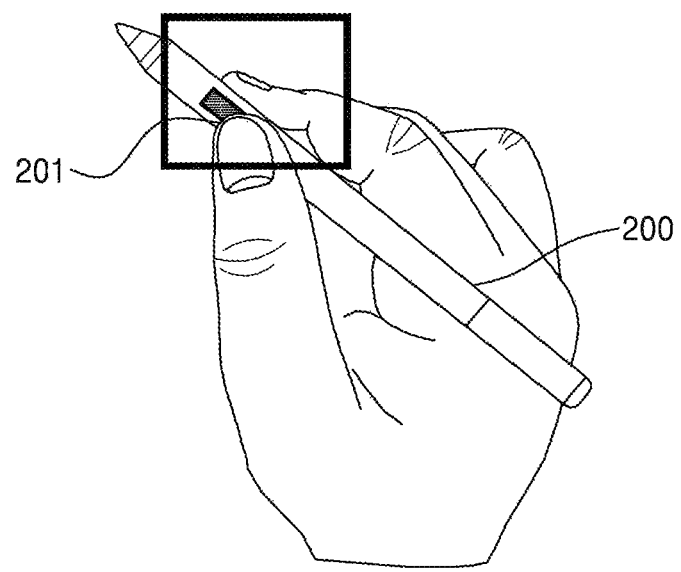

FIG. 7B
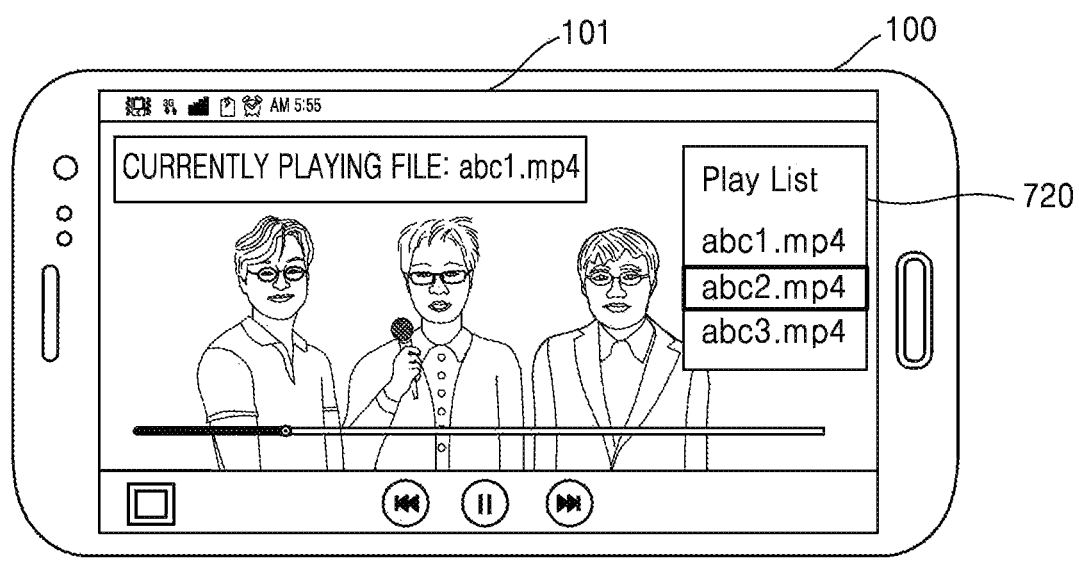
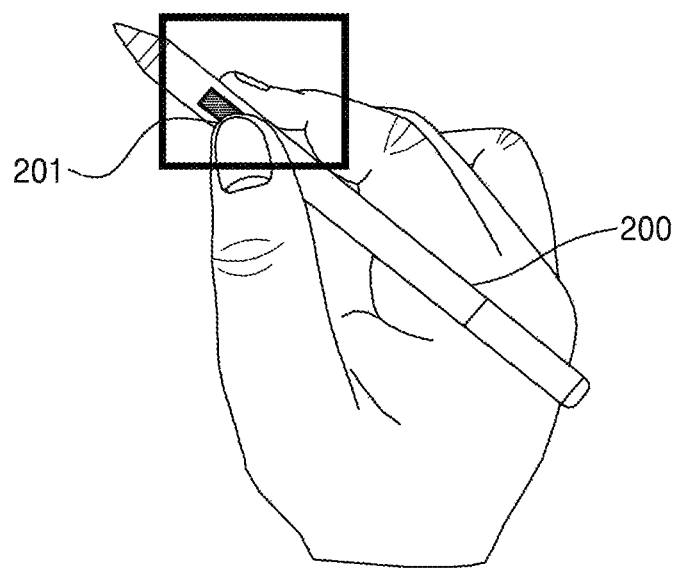

MOBILE DEVICE COMPRISING STYLUS PEN AND OPERATION METHOD THEREFOR

CROSS-REFERENCE TO RELATED APPLICATIONS

This is a continuation of U.S. application Ser. No. 15/520,119 filed Apr. 19, 2017, which is a National Stage Entry of International Application No. PCT/KR2015/010429 filed Oct. 2, 2015, which claims priority based on Chinese Patent Application Nos. 201410567542.7 filed on Oct. 22, 2014 and 201410823126.9 filed on Dec. 25, 2014, and claims priority from Korean Patent Application No. 10-2015-0112723 filed on Aug. 10, 2015. The contents of the above-named applications are incorporated herein by reference in their entireties.

TECHNICAL FIELD

The present invention relates to a mobile device including a stylus pen, and a method of operating the mobile device and, more particularly, to a device and method capable of controlling operation of a mobile device by using a stylus pen.

BACKGROUND ART

A mobile device is a portable device having at least one of a voice and video call function, a data input or output function, a data storage function, etc.

As functions of the mobile device diversify, the mobile device now has complex functions such as image capturing, video recording, music or video playing, game playing, broadcast reception, and wireless data communication (e.g., the Internet) functions. In addition, for user convenience, a mobile device whose operation is capable of being controlled by using a stylus pen has been introduced.

DETAILED DESCRIPTION OF THE INVENTION

Technical Problem

The present invention provides a mobile device capable of remotely controlling an application being executed on the mobile device, by using a stylus pen, and a method of operating the mobile device.

DESCRIPTION OF THE DRAWINGS

FIGS. 5A and 5B are diagrams showing an example in which a camera application is remotely controlled using the stylus pen, according to an embodiment.

FIGS. 7A and 7B are diagrams showing an example in which a video player application is remotely controlled using the stylus pen, according to an embodiment.

BEST MODE

Figure 1:
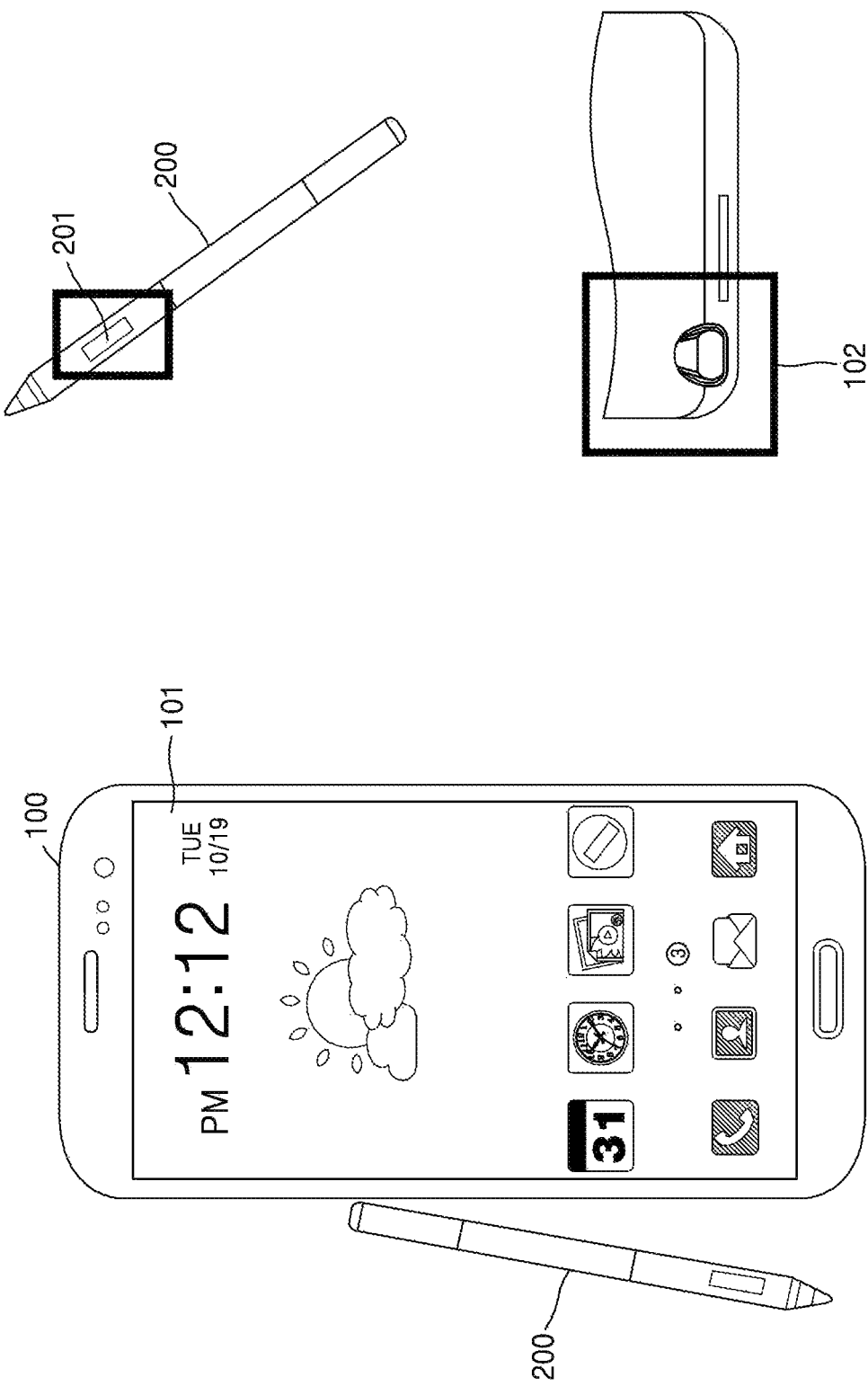
FIG. 1 is a diagram showing a mobile device including a stylus pen, according to an embodiment.

According to an aspect of an embodiment, a mobile device including a stylus pen includes a sensing unit configured to determine whether the stylus pen is separated from the mobile device, a communication unit configured to receive a control signal from the stylus pen separated from the mobile device, and a controller configured to operate in a first control mode for performing at least one operation of an application being executed on the mobile device, in response to the control signal.

The control signal may include a first control signal and a second control signal, and the controller may perform a first operation of the application in response to the first control signal, and perform a second operation of the application in response to the second control signal.

The first control signal may be a signal corresponding to an input of single-clicking a button included in the stylus pen, and the second control signal may be a signal corresponding to an input of double-clicking the button.

The first control signal may be a signal corresponding to a first user motion detected by a motion sensor included in the stylus pen, and the second control signal may be a signal corresponding to a second user motion detected by the motion sensor.

The application may be a camera application having an image capturing function, the first operation may be a zoom-in operation of the camera application, and the second operation may be an image capturing operation.

The application being executed on the mobile device may be an alarm clock application having an alarm clock function, the first operation may be an operation of turning off a ringing alarm, and the second operation may be an operation of setting a new alarm.

The application may be an application having a video player function, the first operation may be an operation of pausing a currently playing video, and the second operation may be an operation of playing a video subsequent to the currently playing video on a playlist.

The controller may operate in a second control mode for performing at least one operation of the application, based on an input of touching a touchscreen with the stylus pen.

The mobile device may further include a user input unit configured to receive a user input of selecting the first control mode or the second control mode.

The sensing unit may detect whether the stylus pen is in proximity to the mobile device, and the controller may change from the first control mode to the second control mode if the stylus pen is in proximity to the mobile device.

The communication unit may control to generate a communication channel between the mobile device and the stylus pen if the stylus pen is separated from the mobile device, and receive the control signal on the communication channel.

The sensing unit may detect whether the stylus pen is inserted into the mobile device, and the controller may terminate the communication channel generated between the mobile device and the stylus pen and change from the first control mode to the second control mode if the stylus pen is inserted into the mobile device.

The controller may change from the first control mode to the second control mode if execution of the application is terminated.

The mobile device may further include a display configured to display an icon indicating the first control mode, if the controller is operating in the first control mode.

According to an aspect of another embodiment, a method of operating a mobile device including a stylus pen includes determining whether the stylus pen is separated from the mobile device, receiving a control signal from the stylus pen separated from the mobile device, and operating in a first control mode for performing at least one operation of an application being executed on the mobile device, in response to the control signal.

The control signal may include a first control signal and a second control signal, and the operating in the first control mode may include performing a first operation of the application in response to the first control signal, and performing a second operation of the application in response to the second control signal.

The first control signal may be a signal corresponding to an input of single-clicking a button included in the stylus pen, and the second control signal may be a signal corresponding to an input of double-clicking the button.

The application may be a camera application having an image capturing function, the first operation may be a zoom-in operation of the camera application, and the second operation may be an image capturing operation.

The application may be an alarm clock application having an alarm clock function, the first operation may be an operation of turning off a ringing alarm, and the second operation may be an operation of setting a new alarm.

The application may be an application having a video player function, the first operation may be an operation of pausing a currently playing video, and the second operation may be an operation of playing a video subsequent to the currently playing video on a playlist.

The method may further include operating in a second control mode for performing at least one operation of the application, based on an input of touching a touchscreen with the stylus pen.

The method may further include receiving a user input of selecting the first control mode or the second control mode.

The method may further include detecting whether the stylus pen is in proximity to the mobile device, and changing from the first control mode to the second control mode if the stylus pen is in proximity to the mobile device.

The method may further include controlling to generate a communication channel between the mobile device and the stylus pen if the stylus pen is separated from the mobile device, and receiving the control signal on the communication channel.

The method may further include detecting whether the stylus pen is inserted into the mobile device, and terminating the communication channel generated between the mobile device and the stylus pen and changing from the first control mode to the second control mode if the stylus pen is inserted into the mobile device.

The method may further include changing from the first control mode to the second control mode if execution of the application is terminated.

The method may further include displaying an icon indicating the first control mode, if the controller is operating in the first control mode.

MODE OF THE INVENTION

Terms used in this specification are now briefly described before describing the present invention.

Although most terms used in this specification are selected among currently popular general terms in consideration of functions implemented in the present invention, some terms are used based on the intentions of those of ordinary skill in the art, precedents, emergence of new technologies, or the like. Specific terms may be arbitrarily selected by the applicant and, in this case, the meanings thereof will be described in the detailed description of the invention. Thus, the terms used herein should be defined based on practical meanings thereof and the whole content of this specification, rather than based on names of the terms.

It will be understood that the terms "comprises", "comprising", "includes" and/or "including", when used herein, specify the presence of stated elements, but do not preclude the presence or addition of one or more other elements. The suffix such as " . . . er", "unit", or "module" is used to denote an entity for performing at least one function or operation, and may be embodied in the form of hardware, software, or a combination thereof.

Throughout the specification, the term "touch input" denotes a gesture of a user which is made on a touchscreen to control a mobile device.

The term "stylus pen" denotes a pen-shaped tool which is used to control a mobile device. For example, a user may control a mobile device by directly tapping or dragging a stylus pen on a touchscreen, or by clicking a button included in the stylus pen.

Hereinafter, the present invention will be described in detail by explaining embodiments of the invention with reference to the attached drawings. The invention may, however, be embodied in many different forms and should not be construed as being limited to the embodiments set forth herein; rather, these embodiments are provided so that this disclosure will be thorough and complete, and will fully convey the concept of the invention to one of ordinary skill in the art. In the drawings, elements irrespective of descriptions of the present invention are not illustrated, and like reference numerals denote like elements.

FIG. 1 is a diagram showing a mobile device 100 including a stylus pen 200, according to an embodiment.

Referring to FIG. 1, the mobile device 100 may include a touchscreen 101 and the stylus pen 200. The mobile device 100 may further include a slot 102 for inserting the stylus pen 200 thereinto. The mobile device 100 and the elements thereof will now be described in detail.

The mobile device 100 may be configured as one of various electronic devices including the touchscreen 101, e.g., a mobile phone, a smartphone, a tablet personal computer (PC), a personal digital assistant (PDA), a portable multimedia player (PMP), or a digital camera, but is not limited thereto.

The stylus pen 200 may include a button 201 which is clickable. A user may control the mobile device 100 by clicking the button 201 of the stylus pen 200 in various manners. For example, the button 201 may be single-clicked, double-clicked, or long-clicked, but is not limited thereto.

The stylus pen 200 may receive an input of clicking the button 201. The stylus pen 200 may transmit a control signal corresponding to the received input, to the mobile device 100. The stylus pen 200 may transmit the control signal to the mobile device 100 by using a communication channel generated between the stylus pen 200 and the mobile device 100.

The stylus pen 200 may further include a motion sensor capable of detecting motion of the user. Herein, the motion sensor may include at least one of a magnetic sensor, a position sensor, an acceleration sensor, a gyroscope sensor, and a proximity sensor, but is not limited thereto.

When the stylus pen 200 includes a motion sensor, the user may express a certain motion by using the stylus pen 200. Then, the motion sensor of the stylus pen 200 may detect the motion of the user, and the mobile device 100 may be controlled based on a signal corresponding to the detected motion of the user. For example, when a camera application is being executed on the mobile device 100, the camera application may perform a zoom-in operation based on a user motion of drawing a circle by using the stylus pen 200.

Herein, the stylus pen 200 may transmit a control signal to the mobile device 100 by using short-range wireless communication, e.g., Bluetooth communication or infrared communication.

If the mobile device 100 receives a user input of tapping or dragging the touchscreen 101, the stylus pen 200 may generate a control signal corresponding to the received user input.

The stylus pen 200 may include a battery. If the stylus pen 200 is inserted into the slot 102 of the mobile device 100, the battery of the stylus pen 200 may be connected to a power supply circuit included in the mobile device 100 and thus may be charged.

Figure 2:
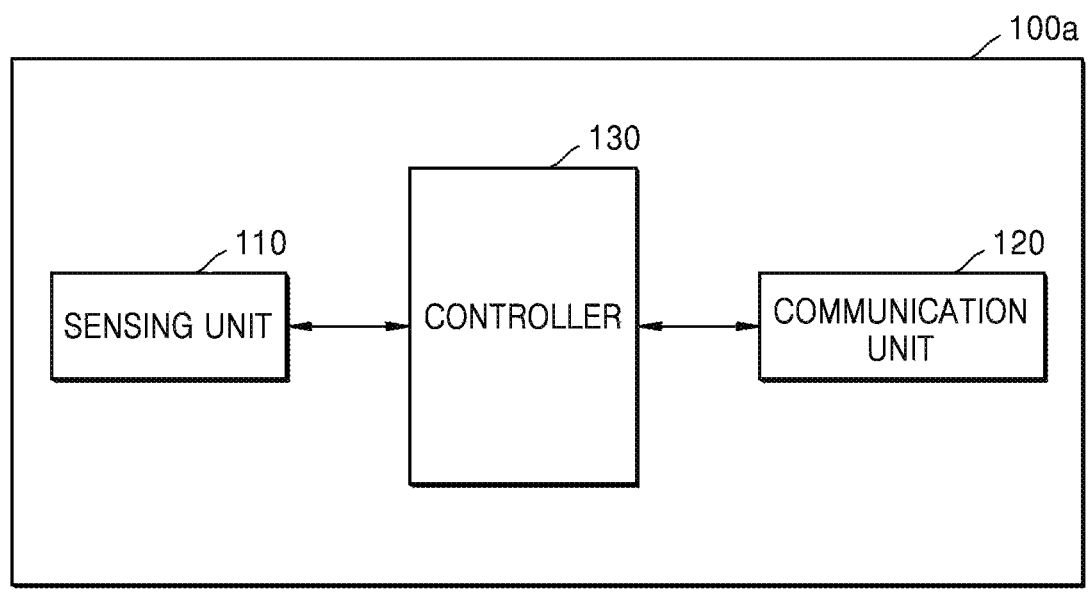
FIG. 2 is a block diagram of a mobile device according to an embodiment.

FIG. 2 is a block diagram of a mobile device 100a according to an embodiment. The mobile device 100a of FIG. 2 may be an embodiment of the mobile device 100 of FIG. 1.

Referring to FIG. 2, the mobile device 100a may include a sensing unit 110, a communication unit 120, and a controller 130.

The sensing unit 110 according to the current embodiment may detect whether the stylus pen 200 is separated from the mobile device 100a, and transmit the detected signal to the controller 130. For example, the sensing unit 110 may detect whether the stylus pen 200 is separated from the mobile device 100a, by determining whether the battery of the stylus pen 200 is being charged. The sensing unit 110 may determine whether the battery of the stylus pen 200 is being charged, by detecting whether a power supply circuit included in the mobile device 100a is connected to the battery of the stylus pen 200.

The sensing unit 110 may periodically monitor whether the stylus pen 200 is separated, by conducting a poll in a certain cycle or transmitting a notification message to the controller 130 when an insertion status of the stylus pen 200 is changed. Herein, the controller 130 may set the cycle of conducting a poll to a fixed value or a value variable by a user. The scheme of conducting a poll or transmitting a notification message is well-known to one of ordinary skill in the art, and thus a detailed description thereof is not provided herein.

The communication unit 120 according to the current embodiment may include one or more elements for performing communication between the mobile device 100a and the stylus pen 200 or communication with an external device.

If the stylus pen 200 is separated from the mobile device 100a, the communication unit 120 may generate a communication channel between the mobile device 100a and the stylus pen 200.

In addition, the communication unit 120 may receive a control signal from the stylus pen 200 separated from the mobile device 100a, on the generated communication channel. Specifically, the communication unit 120 may receive the control signal from the stylus pen 200 by using, for example, Bluetooth communication or infrared communication. However, the communication scheme is not limited thereto.

The controller 130 according to the current embodiment may operate in a first control mode for performing at least one operation of an application being executed on the mobile device 100a, in response to the control signal received from the stylus pen 200.

The first control mode may be a mode capable of remotely controlling the application being executed on the mobile device 100a, by using the button 201 included in the stylus pen 200. Specifically, the user may remotely control the application by clicking the button 201 of the stylus pen 200 in various manners. Herein, the button 201 may be single-clicked, double-clicked, or long-clicked, but is not limited thereto.

The first control mode may be a mode capable of remotely controlling the application being executed on the mobile device 100a, by using a motion sensor included in the stylus pen 200.

Specifically, the user may express various motions by using the stylus pen 200. For example, the user may express a motion of drawing a circle or a straight line by using the stylus pen 200. The motion sensor included in the stylus pen 200 may detect the motion of the user, and the mobile device 100 may be controlled based on a signal corresponding to the detected motion of the user. For example, when a camera application is being executed on the mobile device 100a, a zoom-in operation may be performed based on a user motion of drawing a circle, or an image capturing operation may be performed based on a user motion of drawing a straight line. Herein, an operation of the mobile device 100a, which is performed based on a specific motion of the user, may be changed based on user settings, and is not limited to the above-described example.

The controller 130 may operate in a second control mode for performing at least one operation of the application based on a user input of touching the touchscreen 101 of the mobile device 100a with a finger of the user or the stylus pen 200.

The controller 130 may operate in one of the first control mode and the second control mode based on a user input.

If the stylus pen 200 is in proximity to the mobile device 100a when the controller 130 operates in the first control mode, the controller 130 may change an operation mode of the mobile device 100a from the first control mode to the second control mode.

If the stylus pen 200 is inserted into the mobile device 100a when the controller 130 operates in the first control mode, the controller 130 may change the operation mode of the mobile device 100a from the first control mode to the second control mode.

If execution of the application is terminated when the controller 130 operates in the first control mode, the controller 130 may change the operation mode of the mobile device 100a from the first control mode to the second control mode.

If the stylus pen 200 is separated from the mobile device 100a after the application is executed, the controller 130 may operate in the first control mode. When the application is executed, the mobile device 100a may display a message for asking whether to operate in the first control mode.

Figure 3:
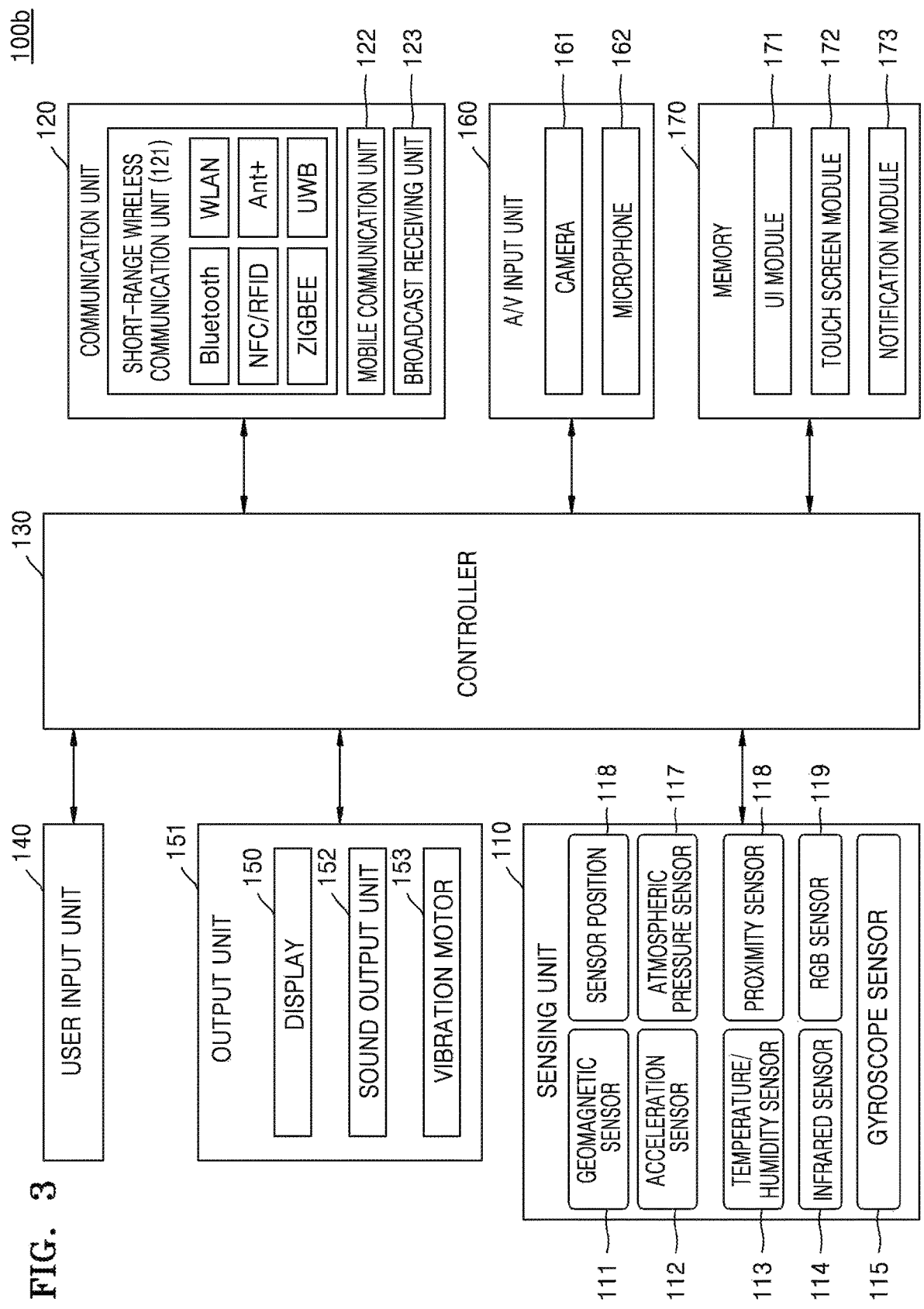
FIG. 3 is a block diagram of a mobile device according to another embodiment.

FIG. 3 is a block diagram of a mobile device 100b according to another embodiment.

As illustrated in FIG. 3, the mobile device 100b according to the current embodiment may include the sensing unit 110, the communication unit 120, the controller 130, a user input unit 140, a display 150, an audio/video (A/V) input unit 160, and a storage 170.

The elements of the mobile device 100b will now be described one by one. The descriptions of the sensing unit 110, the communication unit 120, and the controller 130, which are given above in relation to FIG. 2, are not provided in FIG. 3.

The sensing unit 110 may detect a status or a peripheral status of the mobile device 100b and transmit the detected information to the controller 130.

The sensing unit 110 may include at least one of a magnetic sensor 111, an acceleration sensor 112, a temperature/humidity sensor 113, an infrared sensor 114, a gyroscope sensor 115, a position sensor (e.g., a global positioning system (GPS)) 116, a barometric pressure sensor 117, a proximity sensor 118, and an RGB sensor (or an illuminance sensor) 119, but is not limited thereto. Functions of the sensors may be intuitively inferred from their names by one of ordinary skill in the art, and thus detailed descriptions thereof are not provided herein.

The sensing unit 110 may detect motion of the mobile device 100b, a biological signal of a user of the mobile device 100b, and a touch signal input to the mobile device 100b.

The communication unit 120 may include one or more elements for performing communication between the mobile device 100b and the stylus pen 200 or communication with an external device. For example, the communication unit 120 may include a short-range wireless communication unit 121, a mobile communication unit 122, and a broadcast reception unit 123.

The short-range wireless communication unit 121 may include a Bluetooth communication unit, a near field communication (NFC) unit, a wireless local area network (WLAN) (or Wi-Fi) communication unit, a Zigbee communication unit, an Infrared Data Association (IrDA) communication unit, a Wi-Fi direct (WFD) communication unit, an ultra-wideband (UWB) communication unit, and an Ant+ communication unit, but is not limited thereto.

The mobile communication unit 122 transmits and receives wireless signals to and from at least one of a base station, an external device, and a server in a mobile communication network. Herein, the wireless signals may include various types of data based on transmission or reception of a voice call signal, a video call signal, or a text/multimedia message.

The broadcast reception unit 123 receives broadcast signals and/or broadcast information on broadcast channels. The broadcast channels may include satellite channels and terrestrial channels. According to another embodiment, the mobile device 100b may not include the broadcast reception unit 123.

The controller 130 controls overall operations of the mobile device 100b. For example, the controller 130 may control the sensing unit 110, the communication unit 120, an output unit 151, the user input unit 140, the A/V input unit 160, and the memory 170 by executing programs stored in the storage 170.

The output unit 151 is used to output audio signals, video signals, or vibration signals, and may include the display 150, a sound output unit 152, and a vibration motor 153.

The display 150 displays information processed by the mobile device 100b. For example, when the mobile device 100b operates in a first control mode, the display 150 may display an icon indicating the first control mode. Specifically, when the mobile device 100b operates in the first control mode, the display 150 may highlight the icon indicating the first control mode, on the touchscreen 101.

In addition, the display 150 may display a pop-up menu for allowing the user to determine whether to operate the mobile device 100b in the first control mode.

When the display 150 and a touchpad are layered to configure a touchscreen, the display 150 may be used as an input device as well as an output device. The display 150 may include at least one of a liquid crystal display (LCD), a thin film transistor-liquid crystal display (TFT-LCD), an organic light-emitting diode (OLED), a flexible display, a three-dimensional (3D) display, and an electrophoretic display.

The sound output unit 152 outputs audio data received from the communication unit 120 or stored in the memory 170. In addition, the sound output unit 152 outputs sound signals related to functions performed by the mobile device 100b (e.g., call signal reception sound, message reception sound, and notification sound). The sound output unit 152 may include a speaker or a buzzer.

The vibration motor 153 may output vibration signals. For example, the vibration motor 153 may output vibration signals corresponding to output of video data or audio data (e.g., call signal reception sound and message reception sound). In addition, the vibration motor 153 may output vibration signals when touches are input to the touchscreen.

The user input unit 140 refers to an element used when the user inputs data to control the mobile device 100b. For example, the user input unit 140 may include a keypad, a dome switch, a touchpad (e.g., a capacitive overlay type, a resistive overlay type, an infrared beam type, a surface acoustic wave type, an integral strain gauge type, a piezoelectric type), a jog wheel, or a jog switch, but is not limited thereto.

The user input unit 140 may receive a user input of selecting one of the first control mode and a second control mode. The mobile device 100b including the touchscreen 101 may receive the user input on the touchscreen 101. For example, when an application is executed on the mobile device 100*b*, the user may touch the touchscreen 101 with a finger or the stylus pen 200 to select the first control mode or the second control mode. The mobile device 100*b* may be set to automatically operate in the first control mode if the stylus pen 200 is separated from the mobile device 100*b*, or the user may select the operation mode in a pop-up menu displayed on the touchscreen 101.

The A/V input unit 160 is used to input audio signals or video signals, and may include a camera 161 and a microphone 162. The camera 161 may obtain image frames such as still images or video images by using an image sensor in a video call mode or an image capturing mode. The images captured by the image sensor may be processed by the controller 130 or an image processor (not shown).

The image frames processed by the camera 161 may be stored in the storage 170 or transmitted to an external device via the communication unit 120. Two or more cameras 161 may be provided depending on the configuration of the mobile device 100*b*.

The microphone 162 receives an external sound signal and processes the same into electrical voice data. For example, the microphone 162 may receive the sound signal from an external device or the user. The microphone 162 may use various noise reduction algorithms to reduce noise caused when the external sound signal is received.

The storage 170 may store programs for processing and control operations of the controller 130, and store input/output data (e.g., applications, contents, time zone information of an external device, and a contact list).

The storage 170 may include at least one type of storage medium among flash memory, a hard disk, a multimedia card micro, card type memory (e.g., secure digital (SD) or extreme digital (XD) memory), random access memory (RAM), static random access memory (SRAM), read-only memory (ROM), electrically erasable programmable ROM (EEPROM), programmable ROM (PROM), magnetic memory, a magnetic disc, and an optical disc. Alternatively or additionally, the mobile device 100*b* may use a web storage or a cloud server serving as the storage 170 on the Internet.

The programs stored in the storage 170 may be divided into a plurality of modules, e.g., a user interface (UI) module 171, a touchscreen module 172, and a notification module 173, depending on functions thereof.

The UI module 171 may provide a specialized UI or a graphic user interface (GUI) associated with the mobile device 100*b* per application. The touchscreen module 172 may detect a touch gesture of the user on the touchscreen, and transmit information about the touch gesture to the controller 130. The touchscreen module 172 according to the current embodiment may recognize and analyze touch code. The touchscreen module 172 may be configured as independent hardware including a controller.

Various sensors may be provided in or near the touchscreen to detect touches or proximity touches on the touchscreen. An example of the sensors for detecting touches on the touchscreen is a tactile sensor. The tactile sensor refers to a sensor capable of detecting human-sensible or greater strengths of touches of a certain object. The tactile sensor may detect various types of information, e.g., roughness of a contact surface, hardness of a contact object, and temperature of a contact point.

Another example of the sensors for detecting touches on the touchscreen is a proximity sensor.

The proximity sensor refers to a sensor capable of detecting the presence of an object approaching or in proximity of a certain detection surface by using a force of an electromagnetic field or infrared light without a mechanical contact. Examples of the proximity sensor include a transmissive photoelectric sensor, a direct-reflective photoelectric sensor, a mirror-reflective photoelectric sensor, an inductive proximity sensor, a capacitive proximity sensor, a magnetic proximity sensor, and an infrared proximity sensor. The touch gesture of the user may include tap, touch and hold, double tap, drag, pan, flick, drag and drop, swipe, etc.

The notification module 173 may generate a signal for notifying that an event of the mobile device 100*b* has occurred. Examples of the event of the mobile device 100*b* include call signal reception, message reception, key signal input, and schedule notification. The notification module 173 may output the notification signal in the form of a video signal via the display 150, in the form of an audio signal via the sound output unit 152, or in the form of a vibration signal via the vibration motor 153.

Figure 4:
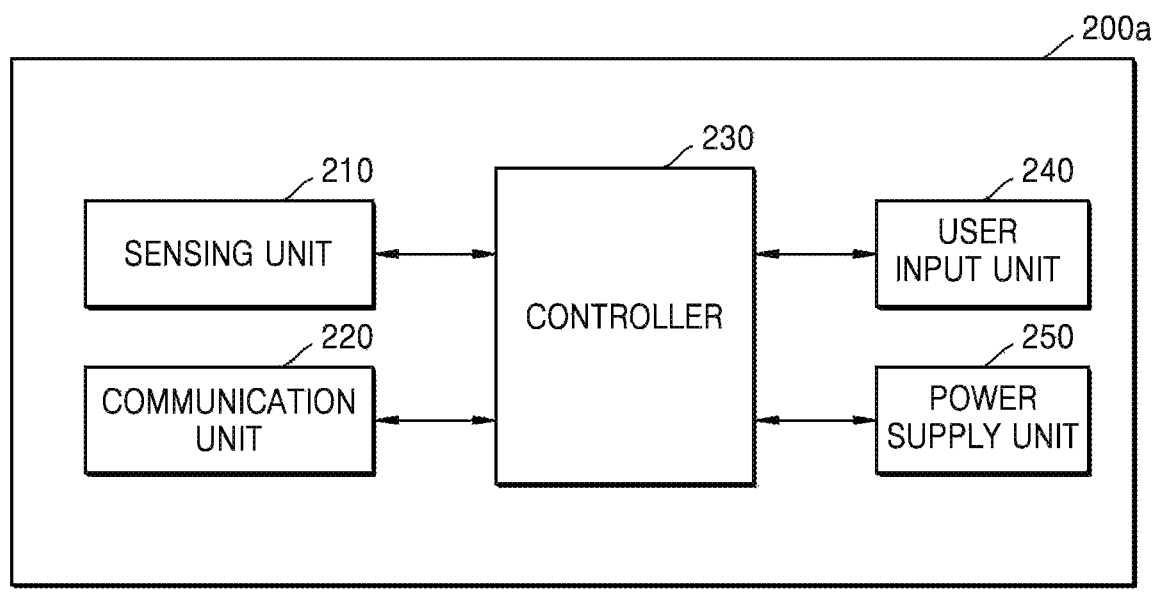
FIG. 4 is a block diagram of a stylus pen according to an embodiment.

FIG. 4 is a block diagram of a stylus pen 200*a* according to an embodiment. The stylus pen 200*a* of FIG. 4 may be an embodiment of the stylus pen 200 of FIG. 1.

Referring to FIG. 4, the stylus pen 200*a* may include a sensing unit 210, a communication unit 220, a controller 230, a user input unit 240, and a power supply unit 250.

The sensing unit 210 may detect whether the stylus pen 200*a* is separated from the mobile device 100, and transmit the detected signal to the controller 230. Specifically, similarly to the sensing unit 110 of the mobile device 100, the sensing unit 210 of the stylus pen 200*a* may detect whether the stylus pen 200*a* is separated, by determining whether a battery of the stylus pen 200*a* is being charged.

The sensing unit 210 may include a proximity sensor. The proximity sensor may detect whether the stylus pen 200*a* is in proximity to the mobile device 100. Based on whether the stylus pen 200*a* and the mobile device 100 are in proximity to each other, short-range wireless communication, e.g., Bluetooth communication, between the stylus pen 200*a* and the mobile device 100 may be turned on/off.

The communication unit 220 may transmit and receive signals to and from one of the mobile devices 100 according to the previous embodiments.

The controller 230 controls overall operations of the stylus pen 200*a*. The controller 230 may transmit a signal corresponding to manipulation of a certain key of the user input unit 240 or a signal corresponding to motion of the stylus pen 200*a*, which is detected by the sensing unit 210, to the mobile device 100 via the communication unit 220.

The user input unit 240 refers to an element used when the user inputs data to control the stylus pen 200*a*. For example, the user input unit 240 may include the button 201. For example, the user input unit 240 may receive an input of long-clicking, single-clicking, or double-clicking the button 201.

The user input unit 240 may include a motion sensor capable of detecting motion of a user. Herein, the motion sensor may include at least one of a magnetic sensor, a position sensor, an acceleration sensor, a gyroscope sensor, and a proximity sensor, but is not limited thereto.

The power supply unit 250 supplies electricity to the stylus pen 200*a*. Specifically, the power supply unit 250 may supply electricity to the stylus pen 200*a* by using a battery. While the stylus pen 200*a* is being inserted into the mobile device 100, the power supply unit 250 of the stylus pen 200*a* is connected to the power supply circuit of the mobile device 100, and the battery may be charged by receiving electricity from the mobile device 100.

FIGS. 5A and 5B are diagrams showing an example in which a camera application is remotely controlled using the stylus pen 200, according to an embodiment. Operations of the camera application controllable using the stylus pen 200 include an image capturing operation, a zoom-in/zoom-out operation, a flash lamp on/off operation, and a captured image preview operation, but are not limited thereto.

An image capturing operation and a zoom-in operation will now be described as examples with reference to FIGS. 5A and 5B.

Referring to FIG. 5A, when the camera application is being executed, the sensing unit 210 of the stylus pen 200 may receive an input of single-clicking the button 201. The communication unit 220 of the stylus pen 200 may transmit a control signal corresponding to the received input, to the communication unit 120 of the mobile device 100. The controller 130 of the mobile device 100 may receive the control signal from the communication unit 120 of the mobile device 100, and perform a zoom-in operation.

If the button 201 is repeatedly clicked, magnification of zoom-in may be increased.

The touchscreen 101 of the mobile device 100 may display an icon 510 indicating that the zoom-in operation is being performed. For example, the icon 510 may be displayed in the form of text and/or a bar as illustrated in FIG. 5A, but is not limited thereto.

Referring to FIG. 5B, the sensing unit 210 of the stylus pen 200 may receive an input of double-clicking the button 201, and the communication unit 220 of the stylus pen 200 may transmit a control signal corresponding thereto, to the mobile device 100. The controller 130 of the mobile device 100 may capture an image based on the control signal received from the stylus pen 200.

If the button 201 of the stylus pen 200 is double-clicked, the touchscreen 101 may display an icon 520 indicating that an image capturing operation is being performed. For example, an icon indicating an image capturing function may be highlighted as illustrated in FIG. 5B, but is not limited thereto.

The controller 130 may change settings about operations of an application to be performed based on how the button 201 of the stylus pen 200 is clicked. For example, the controller 130 may configure settings to perform a zoom-in operation or a flash lamp on operation of a camera application based on a user input of single-clicking the button 201.

When a user directly touches the touchscreen 101 with a finger to take a selfie by using the mobile device 100, the distance between the mobile device 100 and the user should be small. Then, the user may not easily take a photo with desired angle and composition. However, if a photo is taken by clicking the button 201 of the stylus pen 200 as described above in relation to FIG. 5B, the user may take a selfie with various angles and compositions.

Figure 6A:
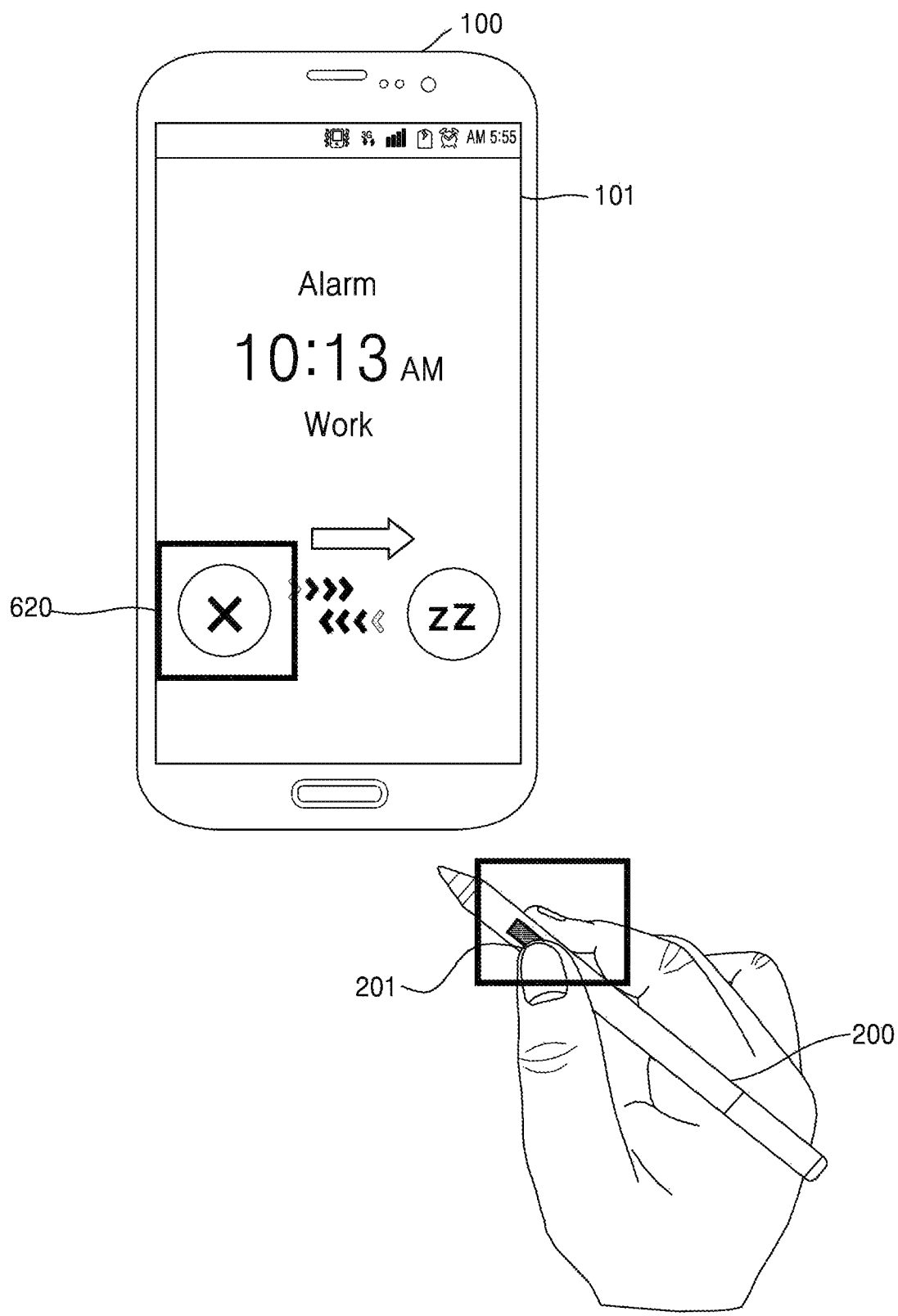
FIGS. 6A and 6B are diagrams showing an example in which an alarm clock application is remotely controlled using the stylus pen, according to an embodiment.
Figure 6B:
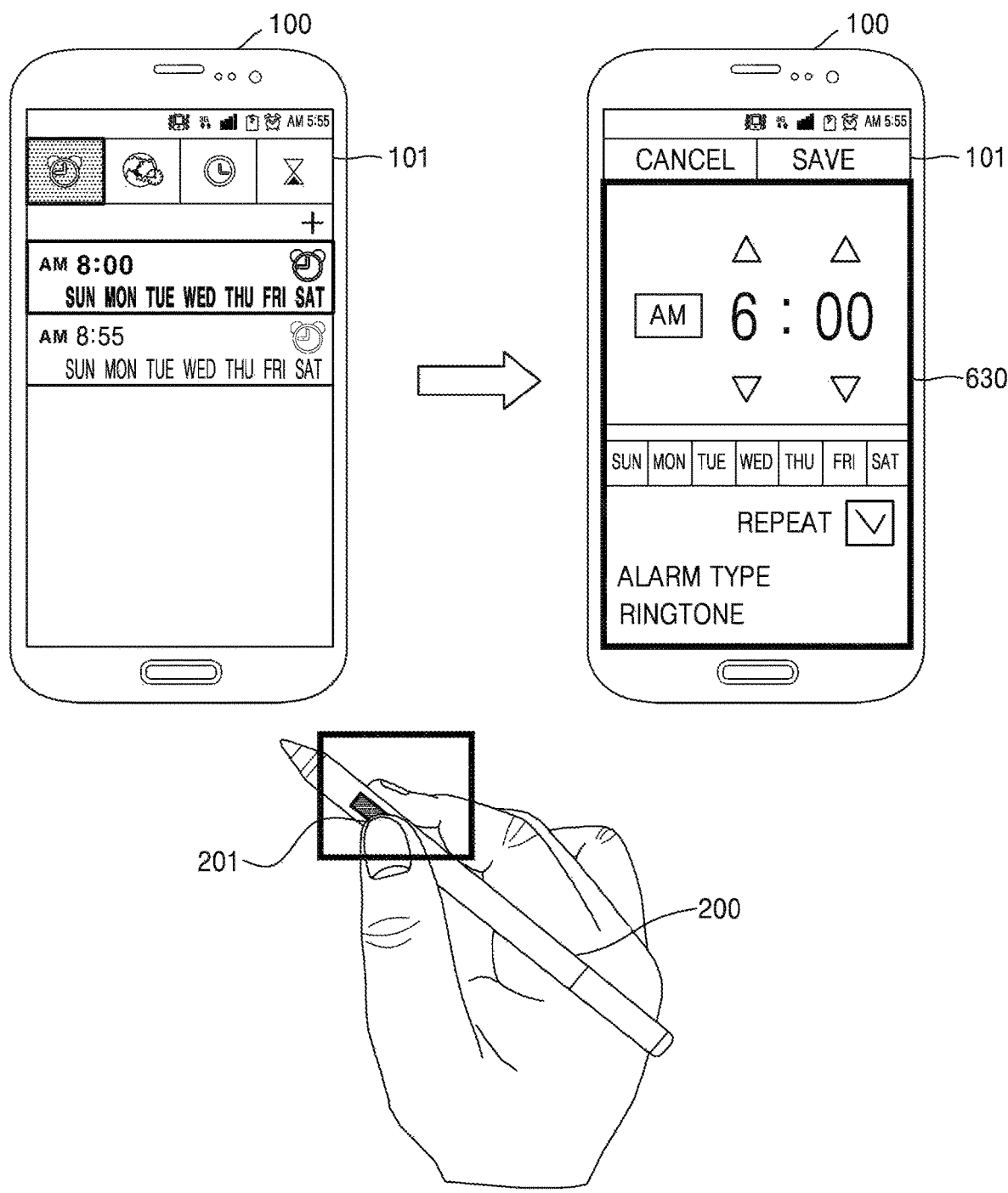

FIGS. 6A and 6B are diagrams showing an example in which an alarm clock application is remotely controlled using the stylus pen 200, according to an embodiment. Operations of the alarm clock application include an operation of turning off a ringing alarm and an operation of setting a new alarm, but are not limited thereto.

Referring to FIG. 6A, when the alarm clock application is executed on the mobile device 100 and an alarm rings, if the button 201 of the stylus pen 200 is single-clicked, the controller 130 may turn off the ringing alarm. Herein, the touchscreen 101 may display an icon 620 for turning off the ringing alarm of the alarm clock application. For example, the touchscreen 101 may display the icon 620 in the form of a slidable icon as illustrated in FIG. 6A, but is not limited thereto.

Referring to FIG. 6B, when the alarm clock application is being executed on the mobile device 100, if the button 201 of the stylus pen 200 is double-clicked, the controller 130 may set a new alarm.

An alarm clock application execution screen image may be configured as a screen image including text and icons as illustrated in FIG. 6B, but is not limited thereto.

When the alarm clock application is being executed, if the button 201 of the stylus pen 200 is double-clicked, the touchscreen 101 may display a screen image 630 for setting a new alarm, as illustrated in FIG. 6B.

The screen image 630 illustrated in FIG. 6B includes time, days, a ringtone, and an alarm type, but is not limited thereto.

Figure 7A:
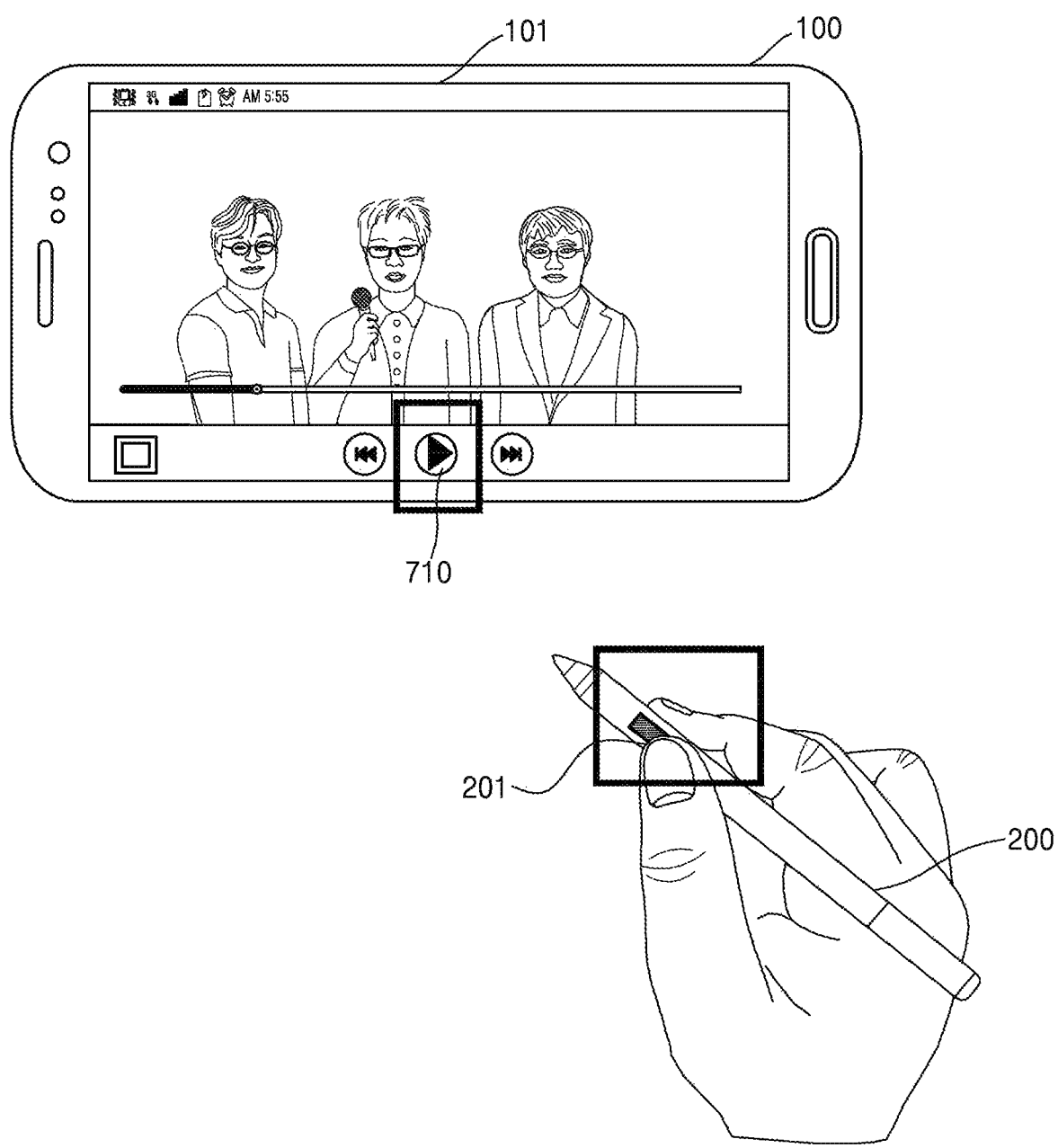

FIGS. 7A and 7B are diagrams showing an example in which a video player application is remotely controlled using the stylus pen 200, according to an embodiment. Operations of the video player application include a play operation, a pause operation, and a fast forward operation, but are not limited thereto. Videos to be played on the video player application may include videos stored in the mobile device 100 or videos streamed via a network, but are not limited thereto.

Referring to FIG. 7A, when a video is being played on the mobile device 100, if the button 201 of the stylus pen 200 is single-clicked by a user, the controller 130 may pause the currently playing video. If the button 201 is single-clicked after the video is paused, the controller 130 may resume playing the paused video.

Referring to FIG. 7B, when a video is being played on the mobile device 100, if the button 201 of the stylus pen 200 is double-clicked by the user, the controller 130 may pause the currently playing video and play a video subsequent to the currently playing video on a playlist.

The playlist may be sorted by file names or storage times of videos stored in the mobile device 100, but is not limited thereto. The playlist may include videos streamed on the Internet as well as the videos stored in the mobile device 100.

For example, as illustrated in FIG. 7B, when the currently playing video has a file name of "abc1.mp4", a playlist 720 displayed on a right side of the touchscreen 101 may be sorted by file names. Herein, if the button 201 is double-clicked by the user, the controller 130 may pause the currently playing video "abc1.mp4" and play a video "abc2.mp4" subsequent to "abc1.mp4" on the playlist 720.

Figure 8:
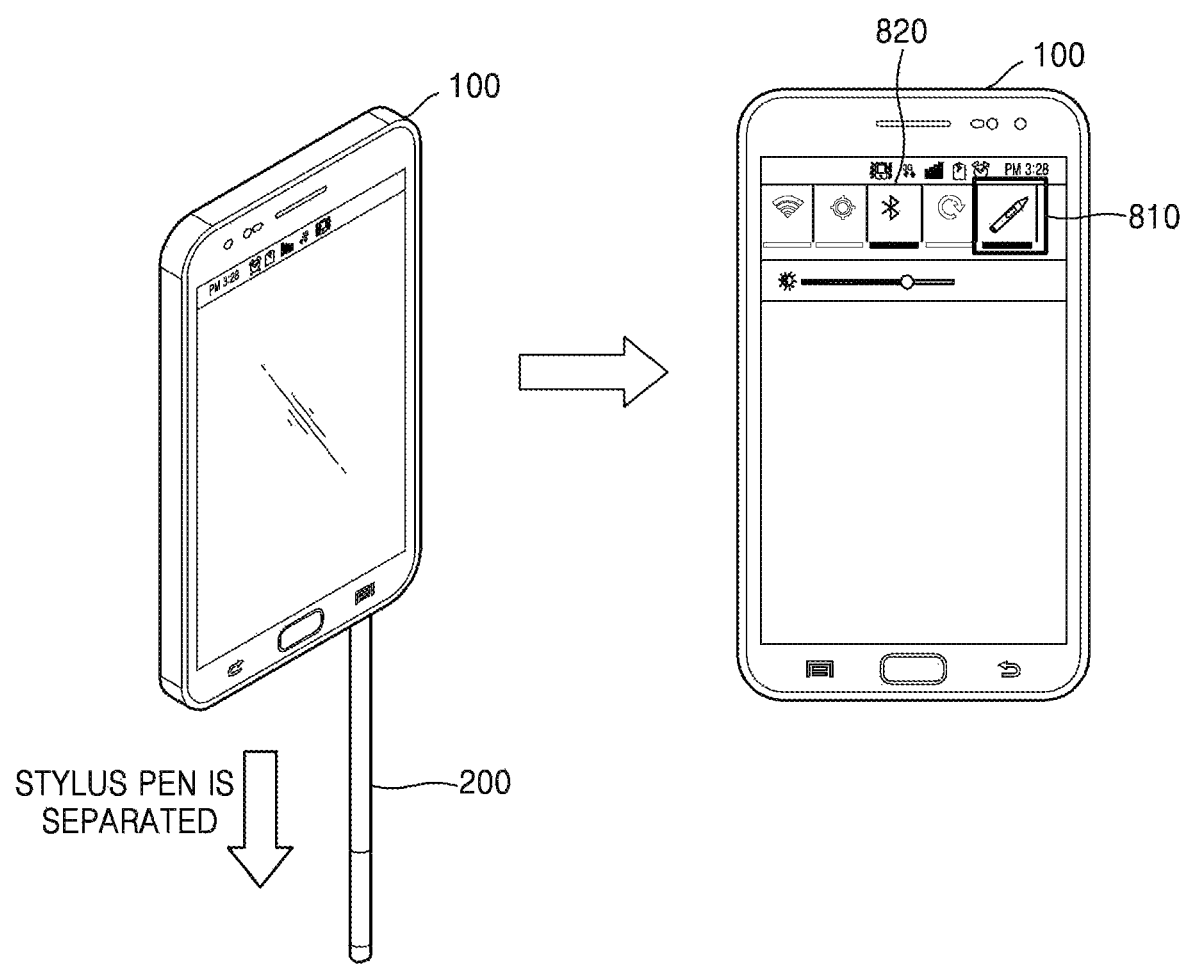
FIG. 8 is a diagram showing an example in which a communication channel is generated between the mobile device and the stylus pen when the stylus pen is separated from the mobile device, according to an embodiment.

FIG. 8 is a diagram showing an example in which a communication channel is generated between the mobile device 100 and the stylus pen 200 when the stylus pen 200 is separated from the mobile device 100, according to an embodiment.

If the stylus pen 200 is separated from the mobile device 100, a communication channel may be generated between the mobile device 100 and the stylus pen 200. Herein, the communication channel may be automatically or manually generated.

A case in which the communication channel is automatically generated will now be described in detail.

If the sensing unit 110 detects that the stylus pen 200 is separated from the mobile device 100, the sensing unit 110 may transmit a first start signal to the controller 130, and the controller 130 may transmit the first start signal to the communication unit 120. Herein, as described above, the sensing unit 110 may detect whether the stylus pen 200 is separated, by determining whether the stylus pen 200 is receiving electricity from the mobile device 100.

The communication unit 120 having received the first start signal may start, for example, Bluetooth communication from the mobile device 100 to generate a communication channel between the mobile device 100 and the stylus pen 200.

The sensing unit 210 and the communication unit 220 of the stylus pen 200 may operate similarly to those of the mobile device 100. Specifically, the sensing unit 210 of the stylus pen 200 may detect whether the stylus pen 200 is separated from the mobile device 100, and transmit the detected signal to the controller 230 of the stylus pen 200. Thereafter, the controller 230 of the stylus pen 200 may transmit a second start signal to the communication unit 220 of the stylus pen 200. The communication unit 220 of the stylus pen 200 having received the second start signal may start, for example, Bluetooth communication to generate a communication channel with the mobile device 100.

The mobile device 100 may receive a control signal from the stylus pen 200 on the generated communication channel. Herein, the communication channel may be generated using various communication schemes, e.g., Bluetooth communication and infrared communication, but is not limited thereto.

For convenience, a case in which a communication channel is generated between the mobile device 100 and the stylus pen 200 by using Bluetooth communication will now be described as an example.

Referring to FIG. 8, the sensing unit 110 may detect that the stylus pen 200 is separated from the mobile device 100, and transmit the detected signal to the controller 130. Thereafter, the controller 130 may transmit a first start signal to the communication unit 120. The communication unit 120 having received the first start signal may start Bluetooth communication of the mobile device 100.

The sensing unit 210 and the communication unit 220 of the stylus pen 200 may also operate as described above. Specifically, the sensing unit 210 may transmit a detected signal to the controller 230. Then, the controller 230 may transmit a second start signal to the communication unit 220, and the communication unit 220 may start Bluetooth communication of the stylus pen 200. Then, a communication channel may be generated between the mobile device 100 and the stylus pen 200 by using Bluetooth communication. The mobile device 100 may receive a control signal from the stylus pen 200 on the generated communication channel.

When the mobile device 100 and the stylus pen 200 are interconnected using Bluetooth communication, the display 150 may highlight an icon 820 indicating Bluetooth communication, and an icon 810 indicating a first control mode. A description thereof will be provided below with reference to FIG. 13.

Although settings are configured to automatically generate a communication channel, the mobile device 100 and the stylus pen 200 may not be interconnected using Bluetooth communication till a certain threshold time. For example, when Bluetooth communication of the mobile device 100 or the stylus pen 200 does not normally operate, although Bluetooth communication is turned on, a communication channel may not be generated between the mobile device 100 and the stylus pen 200. In this case, Bluetooth communication of the mobile device 100 and the stylus pen 200 may be automatically terminated. Herein, the threshold time may be set to a fixed value or a value variable by a user.

While a communication channel is not generated, the mobile device 100 may operate in a second control mode.

The controller 130 may configure settings to manually generate a communication channel between the mobile device 100 and the stylus pen 200. Operations of the mobile device 100 and the stylus pen 200 in a case when settings are configured to manually generate a communication channel will now be described in detail.

The stylus pen 200 may manually turn on/off Bluetooth communication of the stylus pen 200 by using the button 201. Specifically, the controller 230 of the stylus pen 200 may transmit a communication control signal indicating to turn on/off Bluetooth communication, to the communication unit 220. Then, the communication unit 220 having received the communication control signal may start or terminate Bluetooth communication of the stylus pen 200. Herein, the communication control signal differs from a control signal for controlling an application of the mobile device 100 (e.g., a first control signal or a second control signal). For example, settings may be configured to control an application of the mobile device 100 by single-clicking or double-clicking the button 201, and to turn on/off Bluetooth communication of the stylus pen 200 by long-clicking the button 201.

The mobile device 100 may manually turn on/off Bluetooth communication by touching the touchscreen 101 with a finger or the stylus pen 200. This scheme is well-known to one of ordinary skill in the art, and thus a detailed description thereof is not provided herein.

The controller 130 may previously configure settings about whether to automatically generate a communication channel between the mobile device 100 and the stylus pen 200. For example, based on a user input, the controller 130 may configure settings to manually generate a communication channel when the stylus pen 200 is separated from the mobile device 100.

Figure 9:
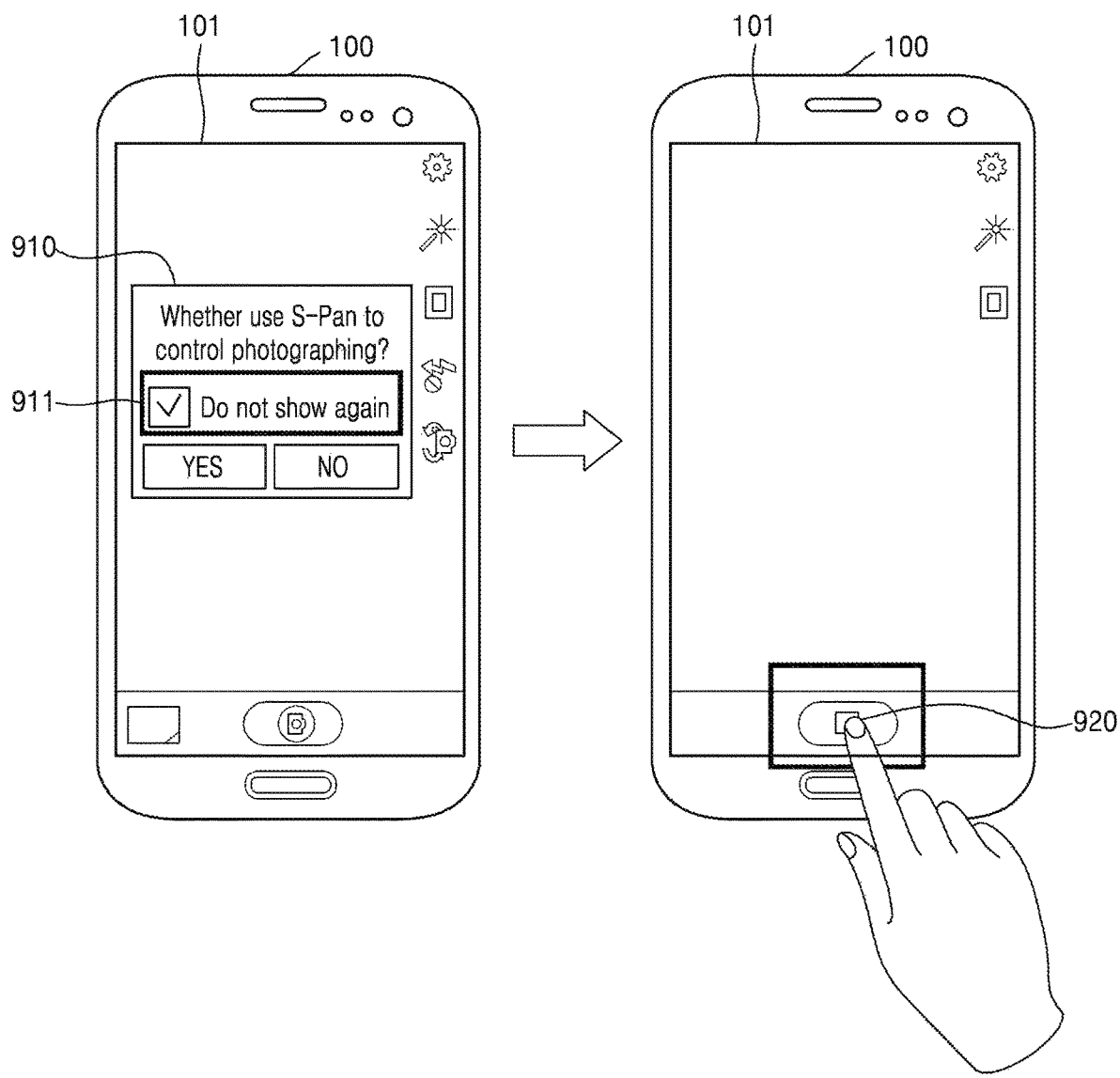
FIG. 9 is a diagram showing an example in which the mobile device operates in a second control mode based on a user input, according to an embodiment.

FIG. 9 is a diagram showing an example in which the mobile device 100 operates in a second control mode based on a user input, according to an embodiment. The second control mode differs from a first control mode for remotely controlling an application being executed on the mobile device 100, based on a user selection of clicking the button 201 of the stylus pen 200.

Specifically, a case in which a camera application is executed while the stylus pen 200 is being separated from the mobile device 100 is described as an example. Herein, the mobile device 100 may operate in the first control mode by default, or operate in the second control mode based on user selection.

Referring to FIG. 9, when a camera application is executed while the stylus pen 200 is being separated from the mobile device 100, the display 150 may display a pop-up window 910 for asking whether to operate in the first control mode. The pop-up window 910 may include a check box 911 for determining whether to display the pop-up window 910 again later. If the check box 911 is checked, although the camera application is executed later while the stylus pen 200 is being separated from the mobile device 100, the display 150 does not display the pop-up window 910 again.

When a user selects the first control mode, the mobile device 100 may operate in the first control mode. Otherwise, the mobile device 100 may operate in the second control mode.

FIG. 9 shows an example in which the user does not select the first control mode. Accordingly, the mobile device 100 may operate in the second control mode, and the mobile device 100 may perform an operation of the camera application based on a user input of touching the touchscreen 101 with a finger or the stylus pen 200. For example, when the finger of the user touches an icon 920 indicating an image capturing operation, which is displayed on the touchscreen 101, as illustrated in FIG. 9, the mobile device 100 may perform the image capturing operation.

Figure 10A:
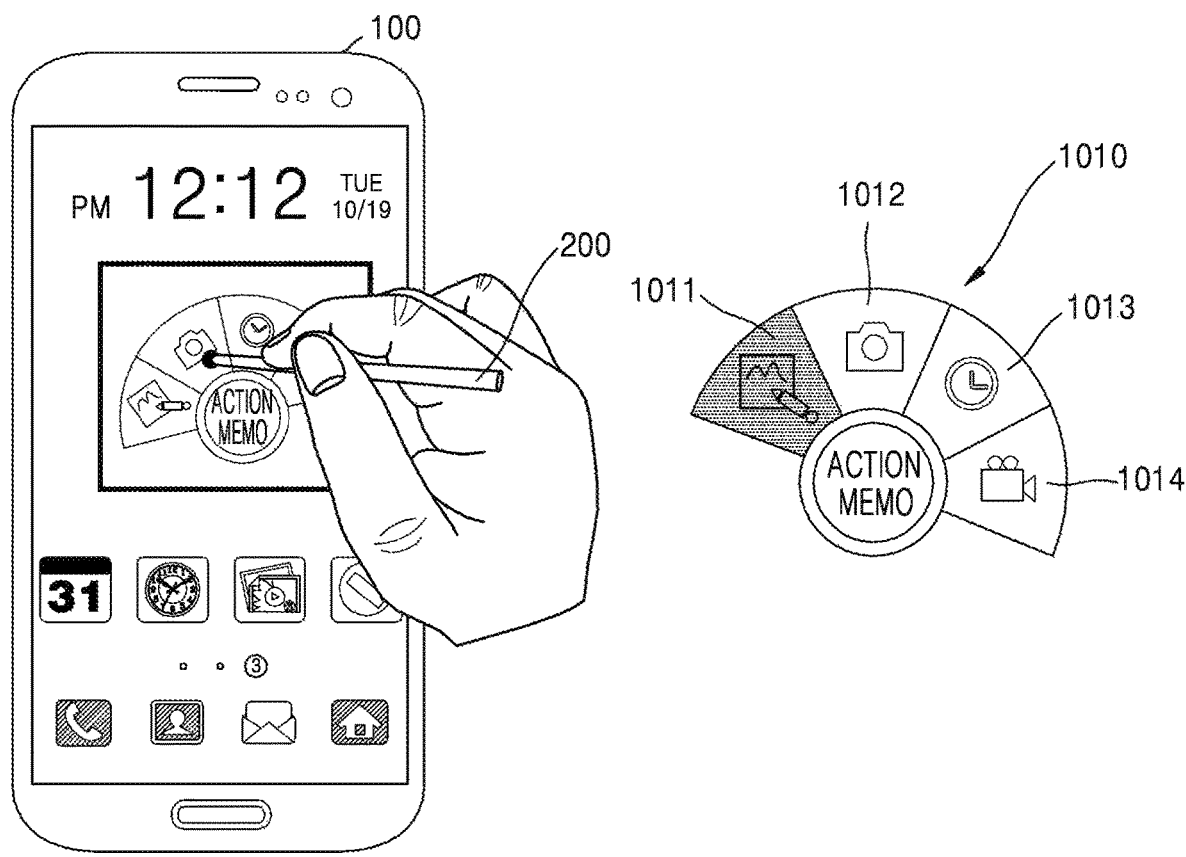
FIGS. 10A and 10B are diagrams for describing a second control mode.
Figure 10B:
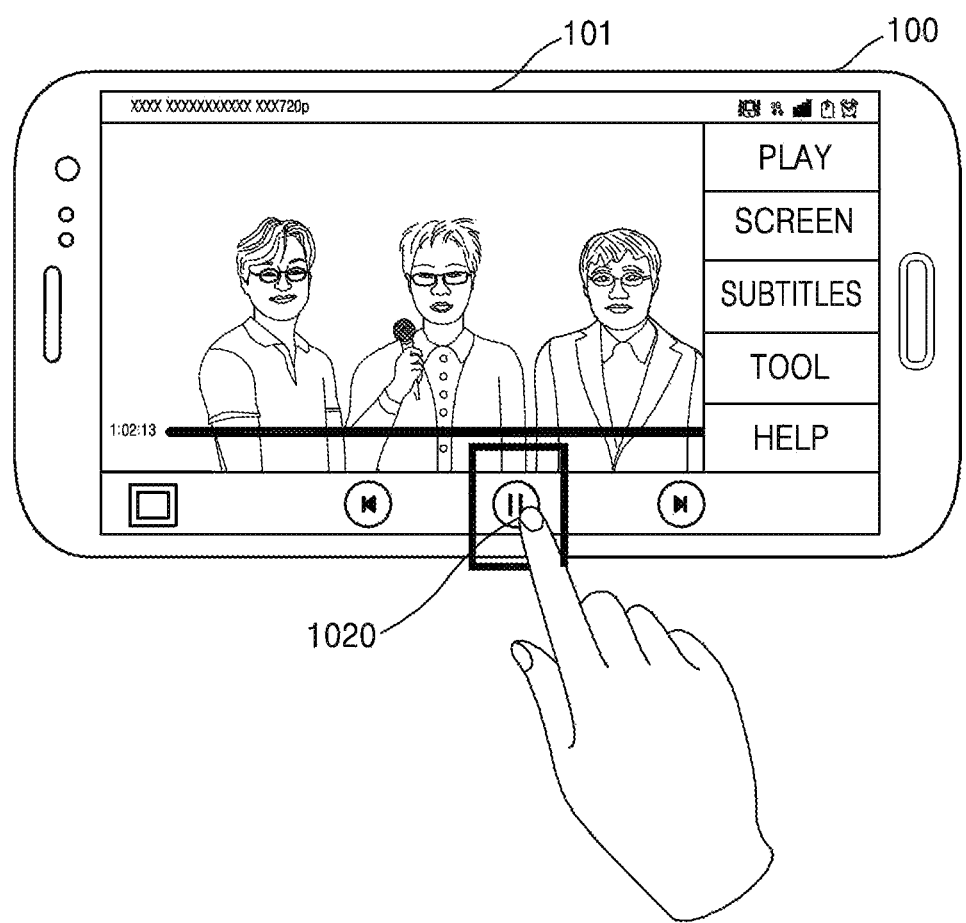

FIGS. 10A and 10B are diagrams for describing a second control mode.

Referring to FIG. 10A, the second control mode may use pop-up shortcut menus 1010 displayed on the touchscreen 101 of the mobile device 100. The pop-up shortcut menus 1010 may include menus related to use of the stylus pen 200. For example, the pop-up shortcut menus 1010 may include a memo application menu 1011, a camera application menu 1012, an alarm clock application menu 1013, and a video player application menu 1014, but are not limited thereto. A user may enable a desired operation by touching a specific one of the pop-up shortcut menus 1010 with the stylus pen 200.

The pop-up shortcut menus 1010 may be displayed in various forms. For example, the pop-up shortcut menus 1010 are displayed in fan shapes as illustrated in FIG. 10A, but are not limited thereto. The pop-up shortcut menus 1010 may be displayed in rectangle shapes or circle shapes, or in the form of a text menu list.

Referring to FIG. 10B, when the mobile device 100 operates in the second control mode, the mobile device 100 may control an application being executed on the mobile device 100, based on an input of touching the touchscreen 101 with a finger of the user or the stylus pen 200. For example, the mobile device 100 may pause a currently playing video based on a user input of touching a "pause" icon 1020 on the touchscreen 101 with a finger as illustrated in FIG. 10B. This scheme is well-known to one of ordinary skill in the art, and thus a detailed description thereof is not provided herein.

When the mobile device 100 operates in the second control mode, the sensing unit 110 may periodically monitor whether the stylus pen 200 is separated from the mobile device 100, in a cycle. Herein, the controller 130 may set the cycle to a fixed value or a value variable by the user.

Figure 11:
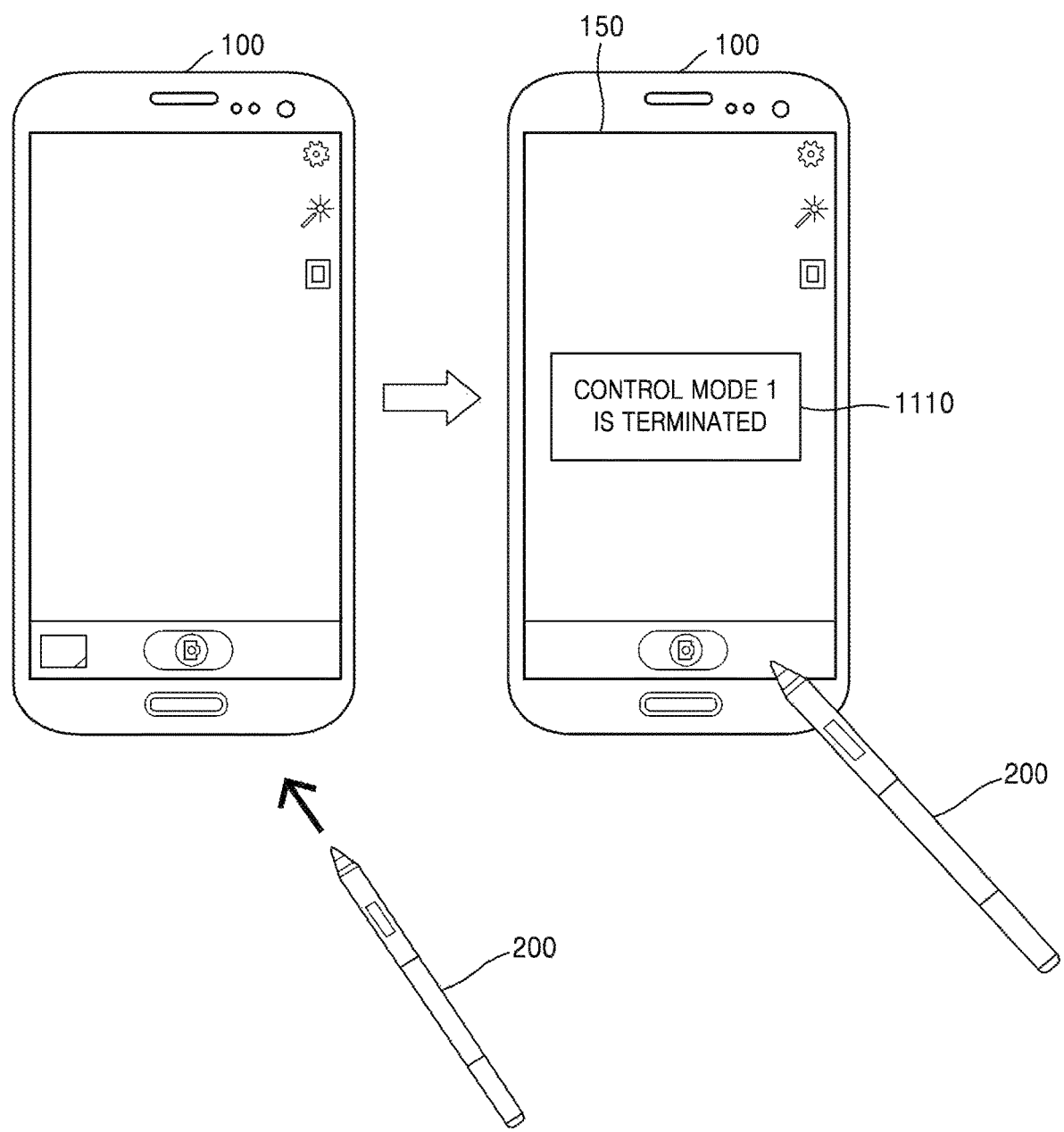
FIG. 11 is a diagram showing an example in which a first control mode is changed to a second control mode when the stylus pen is in proximity to the mobile device, according to an embodiment.

FIG. 11 is a diagram showing an example in which the controller 130 changes an operation mode from a first control mode to a second control mode when the stylus pen 200 is in proximity to the mobile device 100, according to an embodiment.

If the stylus pen 200 is in proximity to the mobile device 100 when the mobile device 100 operates in the first control mode, the controller 130 may change the operation mode from the first control mode to the second control mode.

Referring to FIG. 11, the sensing unit 110 may detect whether the stylus pen 200 is in proximity to the mobile device 100. If the distance between the stylus pen 200 and the mobile device 100 is equal to or less than a certain distance, the mobile device 100 may terminate the first control mode and operate in the second control mode. Herein, the sensing unit 110 may determine whether the stylus pen 200 is in proximity to the mobile device 100, by using a proximity sensor.

If the sensing unit 110 detects that the stylus pen 200 is in proximity to the mobile device 100, the sensing unit 110 may transmit the detected signal to the controller 130. Then, the controller 130 may transmit a notification signal to the communication unit 120. The communication unit 120 having received the notification signal may terminate Bluetooth communication of the mobile device 100.

The sensing unit 210 and the communication unit 220 of the stylus pen 200 may operate similarly to those of the mobile device 100. If the sensing unit 210 of the stylus pen 200 detects that the stylus pen 200 is in proximity to the mobile device 100, the sensing unit 210 of the stylus pen 200 may transmit the detected signal to the controller 230 of the stylus pen 200. Then, the controller 230 of the stylus pen 200 may transmit a notification signal to the communication unit 220 of the stylus pen 200. The communication unit 220 of the stylus pen 200 having received the notification signal may terminate Bluetooth communication of the stylus pen 200.

If the first control mode is terminated, the display 150 may display a pop-up window 1110 indicating that the first control mode is terminated, as illustrated in FIG. 11.

Figure 12:
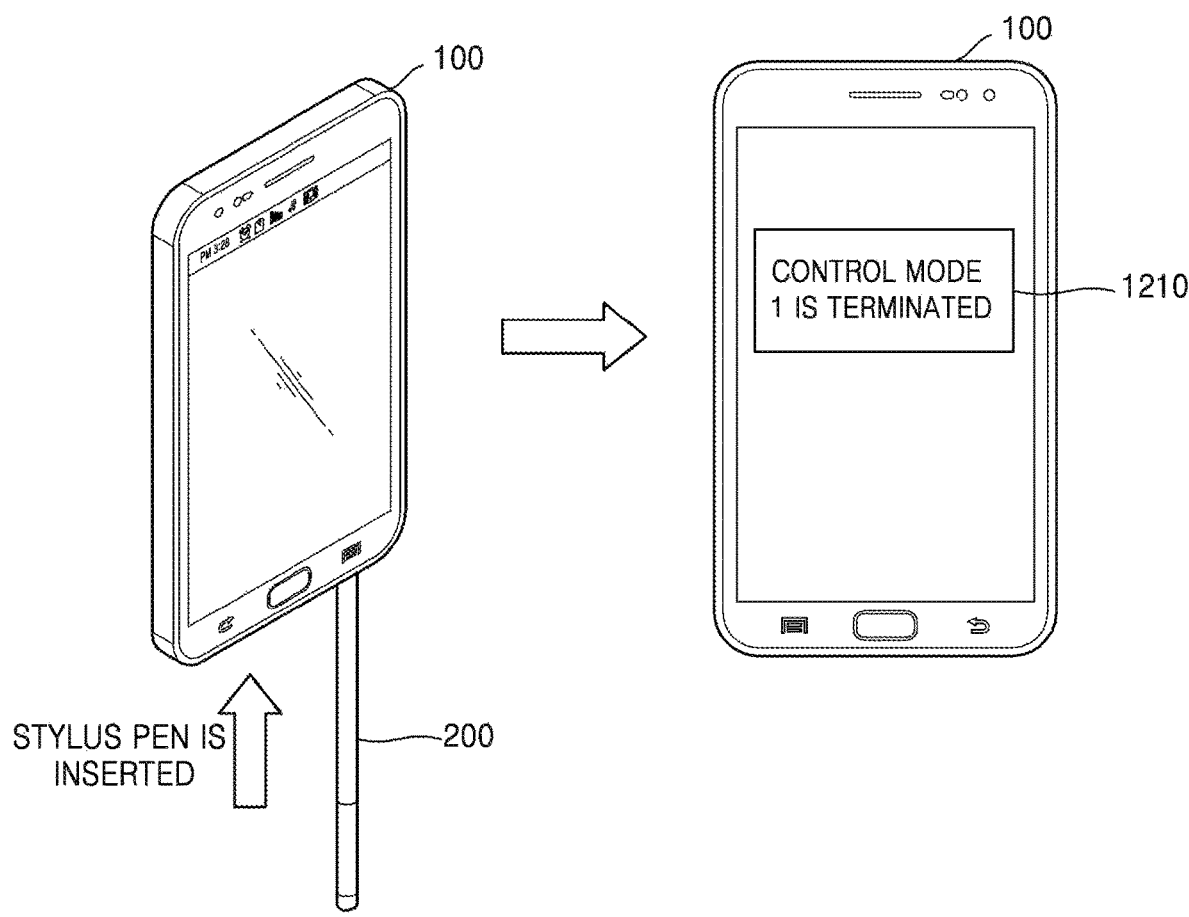
FIG. 12 is a diagram showing an example in which a controller changes an operation mode of the mobile device from a first control mode to a second control mode when the stylus pen is inserted into a slot, according to an embodiment.

FIG. 12 is a diagram showing an example in which the controller 130 changes an operation mode of the mobile device 100 from a first control mode to a second control mode when the stylus pen 200 is inserted into the slot 102, according to an embodiment.

A case in which the stylus pen 200 is inserted into the mobile device 100 when the mobile device 100 operates in the first control mode will now be described as an example with reference to FIG. 12.

The sensing unit 110 may detect that the stylus pen 200 is inserted into the slot 102, and transmit the detected signal to the controller 130. Then, the controller 130 may transmit a first termination signal to the communication unit 120. The communication unit 120 having received the first termination signal may terminate Bluetooth communication of the mobile device 100.

The stylus pen 200 may operate similarly to the mobile device 100. Specifically, the sensing unit 210 of the stylus pen 200 may detect that the stylus pen 200 is inserted into the slot 102, and transmit the detected signal to the controller 230 of the stylus pen 200. Then, the controller 230 of the stylus pen 200 may transmit a second termination signal to the communication unit 220 of the stylus pen 200. The communication unit 220 of the stylus pen 200 having received the second termination signal may terminate Bluetooth communication of the stylus pen 200.

When Bluetooth communication between the mobile device 100 and the stylus pen 200 is terminated, a communication channel generated between the mobile device 100 and the stylus pen 200 may be terminated, and the mobile device 100 may operate in the second control mode.

When the operation mode is changed from the first control mode to the second control mode, the display 150 may display a pop-up window 1210 indicating that the first control mode is terminated, as illustrated in FIG. 12. Herein, a scheme of indicating that the first control mode is terminated may be performed by providing a banner at a top side of the display 150 or flickering a light-emitting diode (LED) provided on the mobile device 100, but is not limited thereto.

Figure 13A:
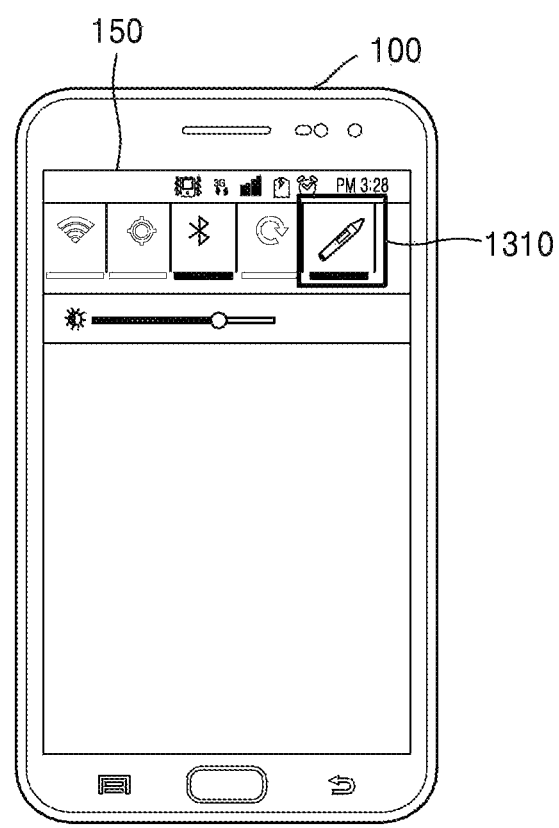
FIGS. 13A and 13B are diagrams showing an example in which a display displays an icon indicating a first control mode, according to an embodiment.
Figure 13B:
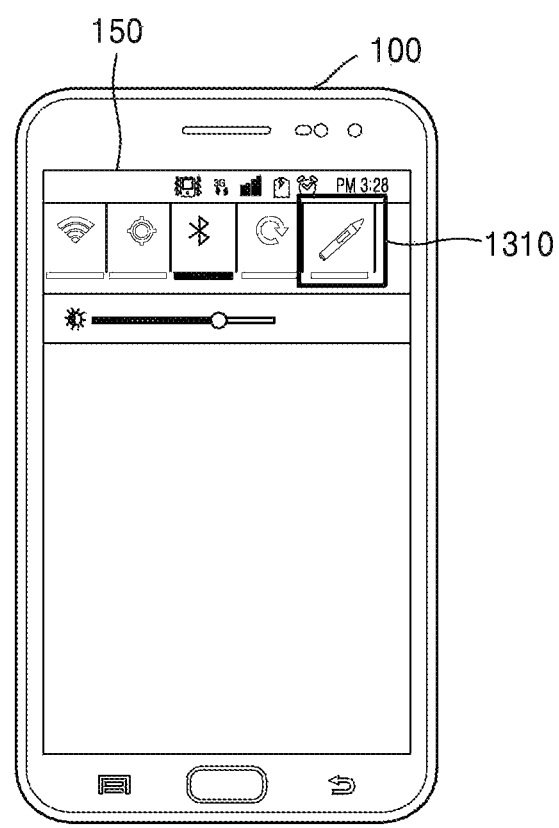

FIGS. 13A and 13B are diagrams showing an example in which the display 150 displays an icon 1310 indicating a first control mode, according to an embodiment.

When the mobile device 100 operates in the first control mode, the display 150 may display the icon 1310 indicating the first control mode.

For example, referring to FIG. 13A, the icon 1310 of a stylus pen shape may be highlighted to indicate that the mobile device 100 is operating in the first control mode.

When the mobile device 100 operates in a second control mode, the display 150 may inactivate the icon 1310 of the stylus pen shape. For example, the display 150 may inactivate the icon 1310 by darkening the icon 1310.

Although the icon 1310 of the stylus pen shape indicates the first control mode in FIGS. 13A and 13B, the icon 1310 may be displayed as a text icon or another type of icon, but is not limited thereto.

Figure 14:
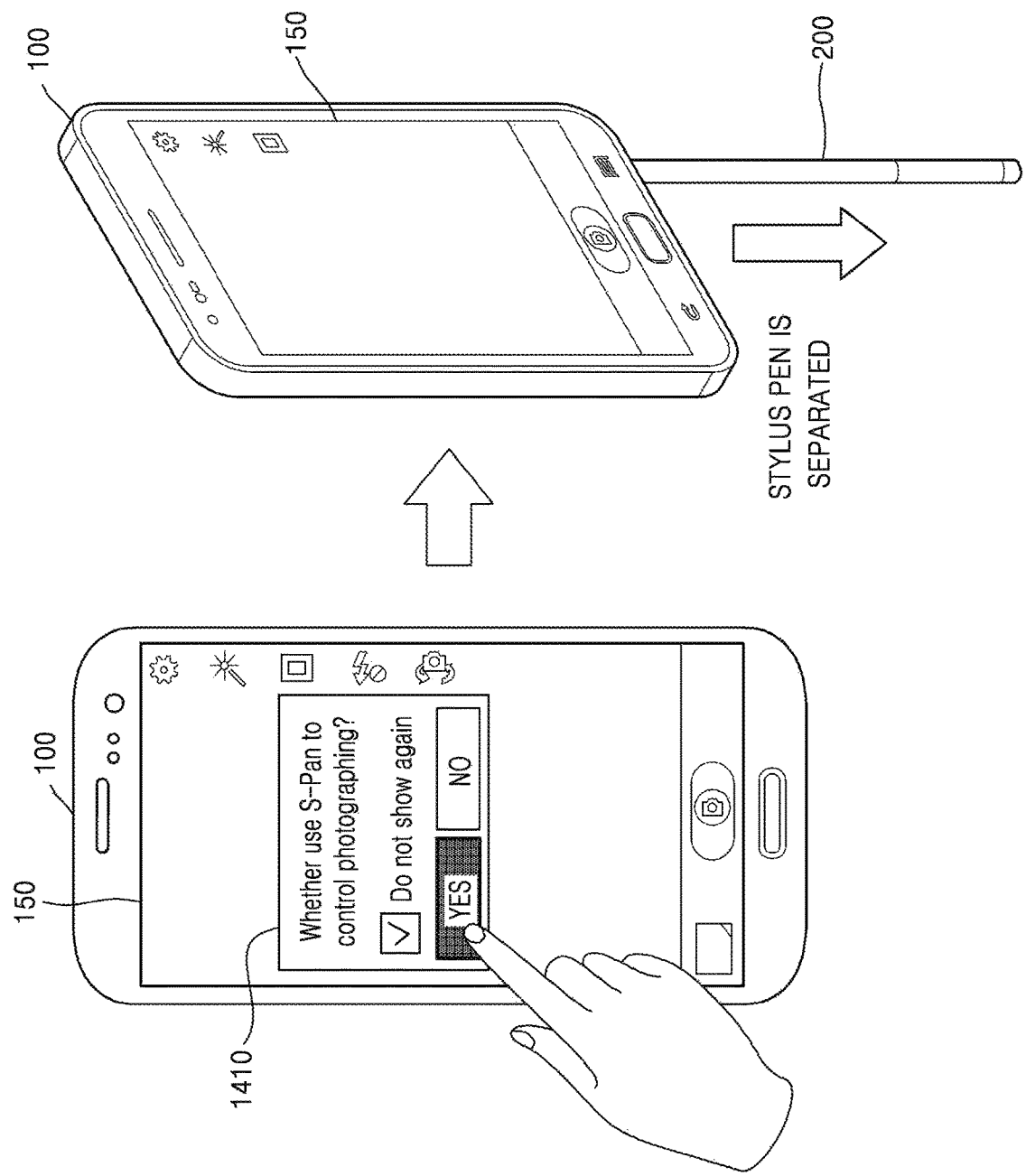
FIG. 14 is a diagram showing an example in which the mobile device operates in a first control mode, according to an embodiment.

FIG. 14 is a diagram showing an example in which the mobile device 100 operates in a first control mode, according to an embodiment.

For example, after an application is executed while the stylus pen 200 is being inserted into the slot 102, the first control mode may be selected.

Referring to FIG. 14, when a camera application is executed on the mobile device 100, the display 150 may display a pop-up window 1410 for asking whether to use the first control mode. As illustrated in FIG. 14, after a user selects "Yes" to select the first control mode, if the stylus pen 200 is separated from the mobile device 100, the sensing unit 110 may transmit a detected signal to the controller 130. Then, the controller 130 may transmit a first start signal to the communication unit 120. The communication unit 120 having received the first start signal may start Bluetooth communication of the mobile device 100 as described above.

The stylus pen 200 may operate similarly to the mobile device 100. Specifically, if the stylus pen 200 is separated from the mobile device 100, the sensing unit 210 of the stylus pen 200 may transmit a detected signal to the controller 230 of the stylus pen 200. Then, the controller 230 of the stylus pen 200 may transmit a second start signal to the communication unit 220 of the stylus pen 200. The communication unit 220 of the stylus pen 200 having received the second start signal may start Bluetooth communication of the stylus pen 200.

When Bluetooth communication of the mobile device 100 and the stylus pen 200 is started, a communication channel may be generated between the mobile device 100 and the stylus pen 200. The mobile device 100 may receive a control signal from the stylus pen 200 on the generated communication channel.

Figure 15:
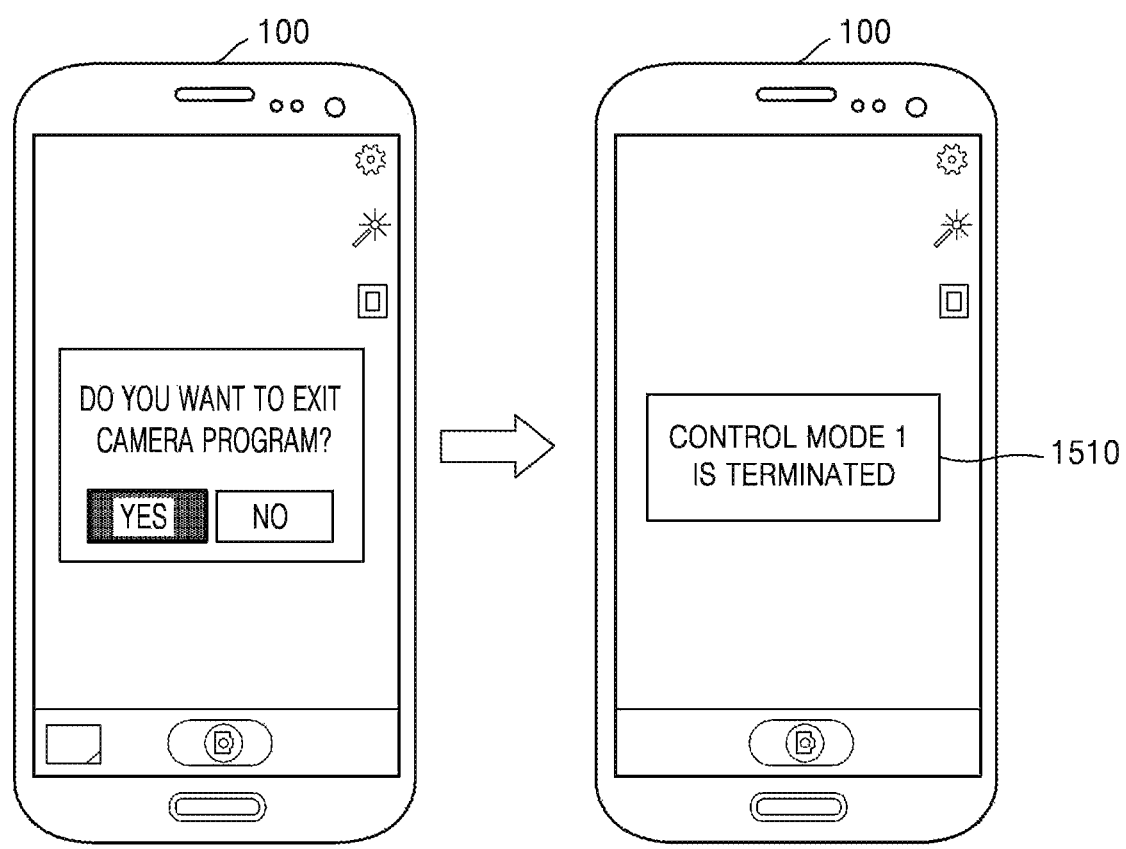
FIG. 15 is a diagram showing an example in which an application being executed on the mobile device is terminated and a first control mode is terminated, according to an embodiment.

FIG. 15 is a diagram showing an example in which an application being executed on the mobile device 100 is terminated and a first control mode is terminated, according to an embodiment.

If an application being executed on the mobile device 100 is terminated when the mobile device 100 is operating in the first control mode, the controller 130 may terminate the first control mode and operate in a second control mode.

Referring to FIG. 15, if a camera application is executed on the mobile device 100 in the first control mode and then is terminated, the controller 130 may automatically terminate the first control mode. When the camera application is terminated, the controller 130 may transmit a first termination signal to the communication unit 120, and the communication unit 120 having received the first termination signal may terminate a communication channel between the mobile device 100 and the stylus pen 200. When the first control mode is terminated, the display 150 may display a pop-up window indicating that the first control mode is terminated, as described above. The display 150 may inactivate an icon indicating the first control mode.

Figure 16:
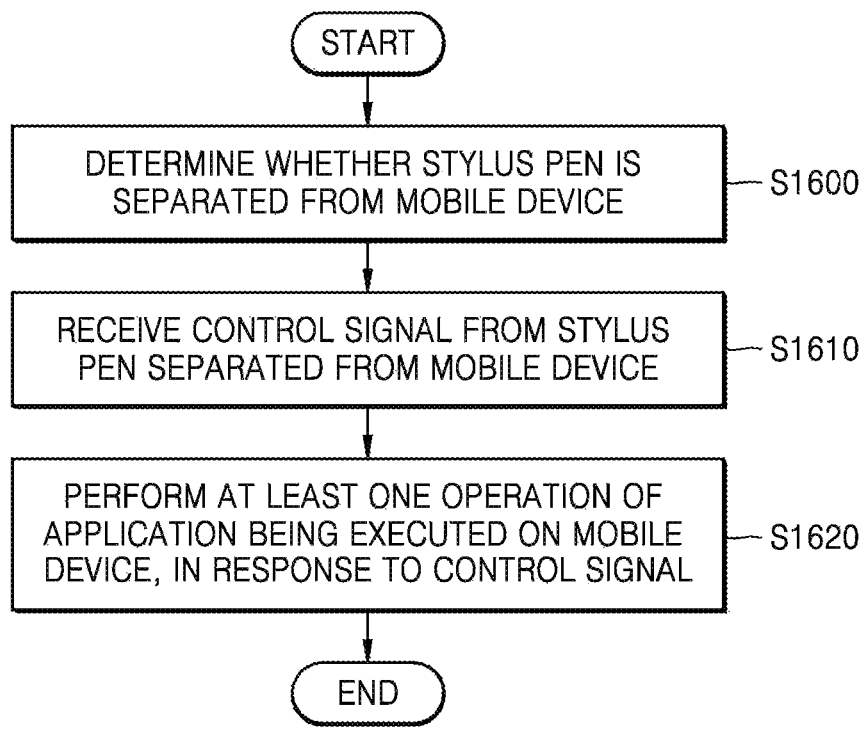
FIG. 16 is a flowchart of a method of operating the mobile device, according to an embodiment.

FIG. 16 is a flowchart of a method of operating the mobile device 100, according to an embodiment.

Referring to FIG. 16, the mobile device 100 may determine whether the stylus pen 200 is separated from the mobile device 100 (S1600).

The mobile device 100 may receive a control signal from the stylus pen 200 separated from the mobile device 100 (S1610).

Herein, the control signal may be a signal capable of remotely controlling an application being executed on the mobile device 100. Specifically, the control signal may include a first control signal and a second control signal, which may be divided based on various schemes of clicking the button 201 of the stylus pen 200. For example, the first control signal may be a signal corresponding to an operation of single-clicking the button 201 of the stylus pen 200 by a user, and the second control signal may be a signal corresponding to an operation of double-clicking the button 201 of the stylus pen 200 by the user.

The mobile device 100 may perform at least one operation of the application being executed on the mobile device 100, in response to the control signal received from the stylus pen 200 (S1620).

For example, when a camera application is being executed on the mobile device 100, if the button 201 of the stylus pen 200 is single-clicked, the mobile device 100 may perform a zoom-in operation. If the button 201 is double-clicked, the mobile device 100 may capture an image.

When an alarm clock application is being executed on the mobile device 100, if the button 201 is single-clicked, the mobile device 100 may turn off a ringing alarm. If the button 201 is double-clicked, the mobile device 100 may set a new alarm.

When a video player application is being executed on the mobile device 100, if the button 201 is single-clicked, the mobile device 100 may pause a currently playing video. If the button 201 is double-clicked, the mobile device 100 may play a video subsequent to the currently playing video on a playlist.

Applications controlled based on user inputs of clicking the button 201 of the stylus pen 200 include the camera application, the alarm clock application, and the video player application, but are not limited thereto.

If the stylus pen 200 is separated from the mobile device 100, a communication channel may be generated between the mobile device 100 and the stylus pen 200.

The mobile device 100 may operate in a second control mode for performing at least one operation of an application, based on an input of touching the touchscreen 101 with a finger of the user or the stylus pen 200.

If the stylus pen 200 is inserted into the slot 102 when the mobile device 100 operates in a first control mode, the communication channel generated between the mobile device 100 and the stylus pen 200 may be automatically terminated. The mobile device 100 may operate in the second control mode.

If an application being executed on the mobile device 100 is terminated when the mobile device 100 operates in the first control mode, the mobile device 100 may operate in the second control mode.

When the mobile device 100 operates in the first control mode, the mobile device 100 may display an icon indicating the first control mode.

As described above, in the mobile device 100 and the method of operating the mobile device 100, according to the afore-described embodiments, operation of an application being executed on the mobile device 100 may be controlled based on a user input of clicking the button 201 of the stylus pen 200. As such, user convenience may be increased when a user uses the mobile device 100.

The above-described method of operating the mobile device 100 can be implemented in the form of program instructions that can be executed through various computer components and recorded on a computer-readable recording medium. The computer-readable recording medium may include program instructions, data files, data structures, or a combination thereof. The program instructions recorded on the computer-readable recording medium may be program instructions specially designed and configured for the present invention or program instructions known to and usable by one of ordinary skill in the art of computer software. Examples of the computer-readable recording medium include magnetic media (e.g., a hard disk, a floppy disk, and a magnetic tape), optical recording media (e.g., a CD-ROM and a DVD), magneto-optical media (e.g., a floptical disk), and hardware devices specially configured to store and execute program instructions (e.g., a ROM, a RAM, and a flash memory). Examples of the program instructions include machine code generated by a compiler and high-level language code that can be executed by a computer using an interpreter or the like.

While the present invention has been particularly shown and described with reference to embodiments thereof, it will be understood by one of ordinary skill in the art that various changes in form and details may be made therein without departing from the spirit and scope of the present invention as defined by the following claims.

The invention claimed is:

1. A mobile device comprising a stylus pen and further comprising:
 a controller configured to:
  perform an application,
  operate in a first control mode for controlling the application being performed on the mobile device based on a touch input received through a touchscreen of the mobile device, and
  switch from the first control mode to a second control mode for controlling remotely the application being performed on the mobile device and establish a communication connection between the mobile device and the stylus pen, when the stylus pen is separated from the mobile device and is not within a certain distance or less from the touchscreen included in the mobile device; and a communication unit configured to:
  receive a first control signal from the stylus pen over the communication connection, wherein the first control signal is sent from the stylus pen based on a first input being received in a user interface included in the stylus pen, and
  receive a second control signal from the stylus pen over the communication connection, wherein the second control signal is sent from the stylus pen based on a second input being received in the user interface included in the stylus pen,
 wherein the controller is further configured to, in the second control mode, perform a first operation of the application based on the first control signal, and perform a second operation of the application based on the second control signal.

2. The mobile device of claim 1, wherein the application is a camera application having an image capturing function,
 wherein the first operation is a zoom-in operation of the camera application, and
 wherein the second operation is an image capturing operation.

3. The mobile device of claim 1, wherein the application is a camera application having an image capturing function, and
 wherein the first operation or the second operation comprises at least one from among an image capturing operation, a zoom-in operation, a zoom-out operation, a flash lamp on operation, a flash lamp off operation, and a captured image preview operation.

4. The mobile device of claim 1, wherein the application is a camera application having an image capturing function,
 wherein the first input corresponds to an input of single-clicking a button included in the user interface included in the stylus pen,
 wherein the second input corresponds to an input of double-clicking the button, and
 wherein the controller is further configured to:
  based on the input of single-clicking the button that is provided by a user, perform a zoom-in operation of the camera application, as the first operation, and
  based on the input of double-clicking the button that is provided by the user subsequent to the input of single-clicking the button, perform an image capturing operation of the camera application, as the second operation.

5. The mobile device of claim 4, wherein, in the performing the zoom-in operation, the controller is further configured to, based on an input of repeatedly clicking the button that is provided by the user, increase magnification of a zoom-in.

6. The mobile device of claim 1, wherein the application is an alarm clock application having an alarm clock function,
 wherein the first operation is an operation of turning off a ringing alarm, and
 wherein the second operation is an operation of setting a new alarm.

7. The mobile device of claim 6, wherein the first input corresponds to an input of single-clicking a button included in the stylus pen,
 wherein the second input corresponds to an input of double-clicking the button, and
 wherein the controller is further configured to:
  based on the input of single-clicking the button being provided by a user, perform the operation of turning off the ringing alarm, and
  based on the input of double-clicking the button that is provided by the user subsequent to the input of single-clicking the button, perform the operation of setting the new alarm.

8. The mobile device of claim 1, wherein the application has a video player function,
 wherein the first operation is an operation of pausing a currently playing video, and
 wherein the second operation is an operation of playing a video subsequent to the currently playing video on a playlist.

9. The mobile device of claim 8, wherein the first input corresponds to an input of single-clicking a button included in the user interface included in the stylus pen,
 wherein the second input corresponds to an input of double-clicking the button, and
 wherein the controller is further configured to:
  based on the input of single-clicking the button that is provided by a user, perform the operation of pausing the currently playing video, and
  based on the input of double-clicking the button that is provided by the user subsequent to the input of single-clicking the button, perform the operation of playing the video subsequent to the currently playing video on the playlist.

10. The mobile device of claim 1, further comprising a user input unit configured to receive a user selection input of selecting the first control mode, and wherein, in the first control mode, the stylus pen is used for controlling at least one from among the first operation and the second operation of the application by providing a touch input on the touchscreen of the mobile device.

11. The mobile device of claim 1, further comprising a sensing unit configured to, while the controller operates in the second control mode, detect that the stylus pen approached the mobile device, based on the stylus pen being separated from the mobile device by the certain distance or less, wherein, based on the sensing unit detecting that the stylus pen approached the mobile device, the controller is further configured to switch from the second control mode to the first control mode, and wherein, in the first control mode, the stylus pen is used for controlling at least one from among the first operation and the second operation of the application by providing a touch input on the touchscreen of the mobile device.

12. The mobile device of claim 1, wherein the controller is further configured to switch from the second control mode to the first control mode based on an execution of the application being terminated, and wherein, in the first control mode, the stylus pen is used for providing a touch input on the touchscreen of the mobile device.

13. The mobile device of claim 1, further comprising a sensing unit configured to detect whether the stylus pen is separated from the mobile device or whether the stylus pen is inserted into the mobile device, wherein the controller is further configured to terminate the communication connection established between the mobile device and the stylus pen and switch from the second control mode to the first control mode based on the stylus pen being inserted into the mobile device, and control at least one from among the first operation and the second operation of the application based on a touch input provided on the touchscreen of the mobile device.

14. The mobile device of claim 1, further comprising a display configured to display an icon indicating that the controller is operating in the second control mode.

15. A method of operating a mobile device comprising a stylus pen, the method comprising:

performing an application;

operating in a first control mode for controlling the application being performed on the mobile device based on a touch input received through a touchscreen of the mobile device;

switching from the first control mode to a second control mode for controlling remotely the application being performed on the mobile device, and establishing a communication connection between the mobile device and the stylus pen separated from the mobile device, when the stylus pen is separated from the mobile device and is not within a certain distance or less from the touchscreen included in the mobile device;

receiving a first control signal from the stylus pen over the communication connection, wherein the first control signal is sent from the stylus pen based on a first input being received in a user interface included in the stylus pen;

receiving a second control signal from the stylus pen over the communication connection, wherein the second control signal is sent from the stylus pen based on a second input being received in the user interface included in the stylus pen; and operating in the second control mode, wherein the operating in the second control mode comprises:

performing a first operation of the application based on the first control signal, and performing a second operation of the application based on the second control signal.

16. The method of claim 15, wherein the application is a camera application having an image capturing function, wherein the first operation is a zoom-in operation of the camera application, and wherein the second operation is an image capturing operation.

17. The method of claim 15, wherein the application is an alarm clock application having an alarm clock function, wherein the first operation is an operation of turning off a ringing alarm, and wherein the second operation is an operation of setting a new alarm.

18. The method of claim 15, wherein the application has a video player function, wherein the first operation is an operation of pausing a currently playing video, and wherein the second operation is an operation of playing a video subsequent to the currently playing video on a playlist.

* * * * *